United States Patent [19]
Graves et al.

[11] Patent Number: 5,832,104
[45] Date of Patent: Nov. 3, 1998

[54] METHOD AND APPARATUS FOR DOCUMENT IDENTIFICATION

[75] Inventors: Bradford T. Graves, Arlington Heights; Douglas U. Mennie, Barrington; Mazur A. Richard, Naperville, all of Ill.

[73] Assignee: Cummins-Allison Corp., Mt. Prospect, Ill.

[21] Appl. No.: 785,388

[22] Filed: Jan. 21, 1997

Related U.S. Application Data

[60] Division of Ser. No. 287,882, Aug. 9, 1994, which is a continuation-in-part of Ser. No. 127,334, Sep. 27, 1993, Pat. No. 5,467,405, Ser. No. 219,093, Mar. 29, 1994, and Ser. No. 207,592, Mar. 8, 1994, Pat. No. 5,467,406, said Ser. No. 127,334, is a continuation of Ser. No. 885,648, May 19, 1992, Pat. No. 5,295,196, which is a continuation-in-part of Ser. No. 475,111, Feb. 5, 1990, abandoned, said Ser. No. 219,093, is a continuation-in-part of Ser. No. 127,334, which is a continuation of Ser. No. 885,648, which is a continuation-in-part of Ser. No. 475,111, said Ser. No. 207,592, is a continuation-in-part of Ser. No. 127,334, which is a continuation of Ser. No. 885,648, which is a continuation-in-part of Ser. No. 475,111.

[51] Int. Cl.⁶ ........................................................ G06K 9/00
[52] U.S. Cl. .......................... 382/135; 382/209; 382/318; 382/321
[58] Field of Search ...................................... 382/135, 137, 382/140, 165, 209, 318, 319, 320, 321, 323; 209/534; 250/556; 356/71; 194/206

[56] References Cited

U.S. PATENT DOCUMENTS

| | | | |
|---|---|---|---|
| 3,246,295 | 4/1966 | DeClaris et al. | 382/56 |
| 3,280,974 | 10/1966 | Riddle et al. | 209/111.8 |
| 3,480,785 | 11/1969 | Aufderheide | 250/219 |
| 3,496,370 | 2/1970 | Haville et al. | 250/219 |
| 3,509,535 | 4/1970 | Berube | 340/149 |
| 3,612,835 | 10/1971 | Andrews et al. | 235/61.11 D |

(List continued on next page.)

FOREIGN PATENT DOCUMENTS

| | | |
|---|---|---|
| A0077464 | 4/1983 | European Pat. Off. . |
| 101115 | 2/1984 | European Pat. Off. . |
| 0 253 935 A2 | 10/1986 | European Pat. Off. . |
| A-338123 | 10/1989 | European Pat. Off. . |

(List continued on next page.)

OTHER PUBLICATIONS

Glory GFRT–1 Currency Scanner (Dec. 1994), 1 pg.
Mosler Inc. brocure "The Mosler/Toshiba CF–420," 1989.
AFB Currency Recognition System (1982).
Toshiba–Mosler Operator's Manual for CF–420 Cash Settlement System; pp. 1 to C–3; copyr 1989.

(List continued on next page.)

*Primary Examiner*—Phuoc Tran
*Attorney, Agent, or Firm*—Arnold, White & Durkee

[57] ABSTRACT

A currency identification system comprises at least two laterally displaced scanheads, one or more laterally moveable scanheads, or at least two laterally displaced sensors of a linear scanhead. The scanheads or sensors are positioned so as to permit scanning along at least two segments on a first side of a bill. The scanheads or sensors are capable of detecting characteristic information from the bill along the segments and generating corresponding output signals representing variations in the detected characteristic information from which scanned patterns of characteristic information may be generated. The system also comprises a pattern generator for generating at least one scanned pattern from the output signals, the scanned pattern representing analog variations in the characteristic information along a segment of the bill. The system also comprises a memory for storing at least one master pattern associated with each genuine bill. The system further comprises a signal processor for performing a pattern comparison wherein at least one of the scanned patterns or portions thereof is compared with at least one of the master patterns or portions thereof. The signal processor generates an indication of the identity of the bill based on the pattern comparison when the bill is one that the system is capable of identifying.

55 Claims, 12 Drawing Sheets

U.S. PATENT DOCUMENTS

| | | | |
|---|---|---|---|
| 3,679,314 | 7/1972 | Mustert | 356/71 |
| 3,778,628 | 12/1973 | Novak et al. | 250/556 |
| 3,870,629 | 3/1975 | Carter et al. | 209/111.8 |
| 3,906,449 | 9/1975 | Marchak | 340/149 R |
| 3,976,198 | 8/1976 | Carnes et al. | 209/111.7 T |
| 4,041,456 | 8/1977 | Ott et al. | 340/146.3 R |
| 4,096,991 | 6/1978 | Iguchi | 235/419 |
| 4,114,804 | 9/1978 | Jones et al. | 235/476 |
| 4,147,430 | 4/1979 | Gorgone et al. | 356/51 |
| 4,179,685 | 12/1979 | O'Maley | 340/146.3 H |
| 4,250,806 | 2/1981 | Boyson et al. | 101/2 |
| 4,255,651 | 3/1981 | Phillips | 235/92 |
| 4,283,708 | 8/1981 | Lee | 340/246.3 Z |
| 4,288,781 | 9/1981 | Sellner et al. | 340/146.3 |
| 4,302,781 | 11/1981 | Ikeda et al. | 358/486 |
| 4,311,914 | 1/1982 | Huber | 250/556 |
| 4,334,619 | 6/1982 | Horino et al. | 209/551 |
| 4,348,656 | 9/1982 | Gorgone et al. | 340/143.3 R |
| 4,349,111 | 9/1982 | Shah et al. | 209/534 |
| 4,352,988 | 10/1982 | Ishida | 250/559 |
| 4,355,300 | 10/1982 | Weber | 340/146.3 C |
| 4,356,473 | 10/1982 | Freudenthal | 340/146.3 H |
| 4,381,447 | 4/1983 | Horvath et al. | 250/223 |
| 4,386,432 | 5/1983 | Nakamura et al. | 382/135 |
| 4,442,541 | 4/1984 | Finkel et al. | 382/7 |
| 4,461,028 | 7/1984 | Okubo | 382/15 |
| 4,464,786 | 8/1984 | Nishito et al. | 382/7 |
| 4,464,787 | 8/1984 | Fish et al. | 382/7 |
| 4,487,306 | 12/1984 | Nao et al. | 382/7 |
| 4,490,846 | 12/1984 | Ishida et al. | 382/7 |
| 4,513,439 | 4/1985 | Gorgone et al. | 382/7 |
| 4,539,702 | 9/1985 | Oka | 382/7 |
| 4,542,829 | 9/1985 | Emery et al. | 209/534 |
| 4,547,896 | 10/1985 | Ohtombe et al. | 382/135 |
| 4,553,846 | 11/1985 | Hilton et al. | 356/429 |
| 4,556,140 | 12/1985 | Okada | 194/4 |
| 4,559,451 | 12/1985 | Curl | 250/560 |
| 4,563,771 | 1/1986 | Gorgone et al. | 382/7 |
| 4,587,412 | 5/1986 | Apisdorf | 235/449 |
| 4,587,434 | 5/1986 | Roes et al. | 250/556 |
| 4,592,090 | 5/1986 | Curl et al. | 382/7 |
| 4,611,345 | 9/1986 | Ohnishi et al. | 382/7 |
| 4,628,194 | 12/1986 | Dobbins et al. | 235/379 |
| 4,645,936 | 2/1987 | Gorgone | 250/556 |
| 4,650,320 | 3/1987 | Chapman et al. | 356/71 |
| 4,653,647 | 3/1987 | Hashimoto . | |
| 4,677,682 | 6/1987 | Miyagawa et al. | 382/7 |
| 4,700,368 | 10/1987 | Munn et al. | 377/8 |
| 4,733,308 | 3/1988 | Nakamura et al. | 358/496 |
| 4,823,393 | 4/1989 | Kawakami | 382/7 |
| 4,827,306 | 5/1989 | Milford | 382/7 |
| 4,881,268 | 11/1989 | Uchida et al. | 382/7 |
| 4,973,851 | 11/1990 | Lee | 250/556 |
| 4,992,860 | 2/1991 | Hamaguchi et al. | 358/75 |
| 4,996,604 | 2/1991 | Ogawa et al. | 358/486 |
| 5,047,871 | 9/1991 | Meyer et al. | 358/486 |
| 5,068,519 | 11/1991 | Bryce . | |
| 5,122,754 | 6/1992 | Gotaas | 324/676 |
| 5,163,672 | 11/1992 | Mennie | 271/187 |
| 5,167,313 | 12/1992 | Dobbins et al. | 194/317 |
| 5,199,543 | 4/1993 | Kamagami et al. | 194/207 |
| 5,201,395 | 4/1993 | Takizawa et al. | 194/206 |
| 5,207,788 | 5/1993 | Geib et al. | 271/122 |
| 5,261,518 | 11/1993 | Bryce | 194/206 |
| 5,295,196 | 3/1994 | Raterman et al. | 382/7 |
| 5,309,515 | 5/1994 | Troung et al. | 382/7 |
| 5,341,408 | 8/1994 | Melcher et al. | 377/8 |
| 5,430,664 | 7/1995 | Cargill et al. | 364/550 |
| 5,465,821 | 11/1995 | Akioka | 194/207 |
| 5,467,405 | 11/1995 | Raterman et al. | 382/135 |
| 5,467,406 | 11/1995 | Graves et al. | 382/135 |
| 5,523,575 | 6/1996 | Machida et al. | 250/208.1 |
| 5,607,040 | 3/1997 | Mathurin, Sr. | 194/207 |
| 5,633,949 | 5/1997 | Graves et al. | 382/135 |
| 5,640,463 | 6/1997 | Csulits | 382/135 |
| 5,652,802 | 7/1997 | Graves et al. | 382/135 |

FOREIGN PATENT DOCUMENTS

| | | |
|---|---|---|
| A0342647 | 11/1989 | European Pat. Off. . |
| 0 487 316 A2 | 5/1992 | European Pat. Off. . |
| 0718809 A2 | 6/1996 | European Pat. Off. . |
| 2204166 | 11/1988 | United Kingdom . |
| 2272762 | 11/1993 | United Kingdom . |
| WO 87/06041 | 10/1987 | WIPO . |
| WO 90/07165 | 6/1990 | WIPO . |
| WO 91/11778 | 8/1991 | WIPO . |
| WO 92/17394 | 10/1992 | WIPO . |
| WO 93/23824 | 11/1993 | WIPO . |
| WO 94/19773 | 9/1994 | WIPO . |
| WO 95/24691 | 9/1995 | WIPO . |
| WO 96/10800 | 4/1996 | WIPO . |

OTHER PUBLICATIONS

Description of Toshiba–Mosler CF–420 Device; believed to be about 1989.

Currency Systems International, Medium Speed Currency Sorting Family, CPS 600 and CPS 900; 4 pages; date: copyr. 1994.

Currency System Intl'l, Mr. W. Kranister in Conversation With Richard Haycock; pp. 1–5; dated: estimated 1994.

Description of Currency Systems International's CPS 600 and CPS 900 devices; date: estimated 1994.

Glory GSA–500 Sortmaster brochure; 2 pages; date: Jan. 14, 1994.

Currency Systems International/Currency Processing Systems, CPS 300; 4 pages; date copyr. 1992.

Glory GFB–200/210/220/230, Desk–Top Bank Note Counter; 2 pages; date: estimated before Aug. 9, 1994.

Chp. 7 of Mosler DF–420 Cash Management System, Operator's Manual,© 1989.

Drawings of portions of Mosler CF–420 Cash Management System (FIGs. A–C) and description of the same (1989).

Revised drawings of portions of Mosler CF–420 Management System (FIGs. A–C) and description of the same (1989).

JetScan Currency Scanner/Counter, Model 4060, Operators's Manual by Cummins–Allison (Aug. 1991).

Sale of JetScan Currency Scanner/Counter, Model 4060 (Aug. 1991).

JetScan Currrency Scanner/Counter, Model 4061, Operating Instructions by Cummins–Allison (Apr. 20, 1993).

Sale of JetScan Currency Scanner/Counter, Model 4061 (Apr. 20, 1993).

Glory UF–1D brochure; 2 pages; date: estimated before Aug. 9, 1994.

JetScan Currency Scanner/Counter, Model 4062, Operating Instructions by Cummins–Allison (Nov. 28, 1994).

Sale of JetScan Currency Scanner/Counter, Model 4062 (Nov. 28, 1994).

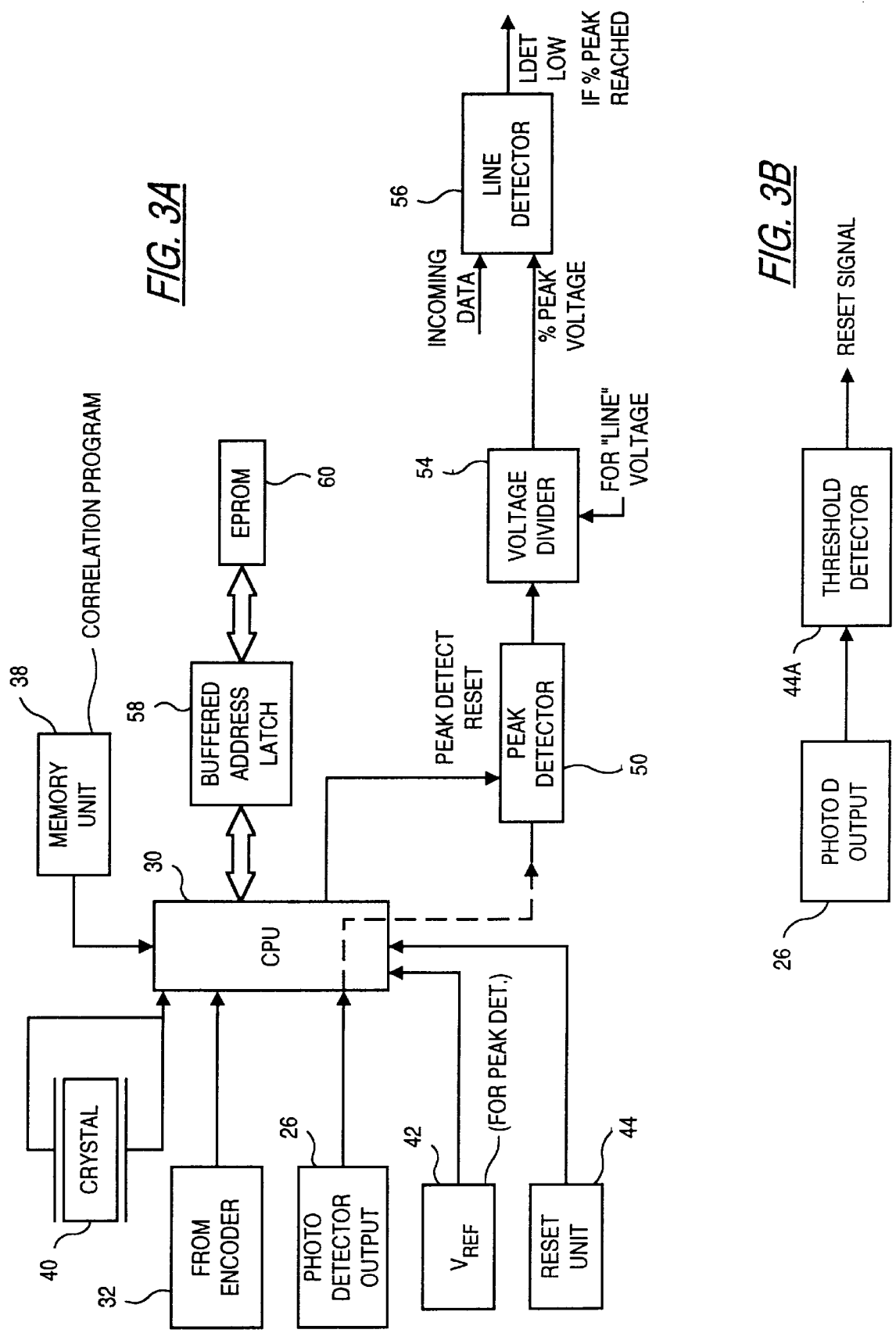

METHOD AND APPARATUS FOR DOCUMENT IDENTIFICATION

CROSS-REFERENCE TO RELATED APPLICATIONS

This application is a divisional of U.S. patent application Ser. No. 08/287,882 filed Aug. 9, 1994 for a "Method and Apparatus for Document Identification." U.S. patent application Ser. No. 08/287,882 is a continuation-in-part of U.S. patent application Ser. No. 08/127,334 filed Sep. 27, 1993, and issued as U.S. Pat. No. 5,467,405, for a "Method and Apparatus for Currency Discrimination and Counting," a continuation-in-part of abandoned U.S. patent application Ser. No. 08/219,093 filed Mar. 29, 1994, for a "Currency Discriminator and Authenticator," and a continuation-in-part of U.S. patent application Ser. No. 08/207,592 filed on Mar. 8, 1994, and issued as U.S. Pat. No. 5,467,406 for a "Method and Apparatus for Currency Discrimination." U.S. patent application Ser. No. 08/127,334 is a continuation of U.S. patent application Ser. No. 07/885,648, filed on May 19, 1992, and issued as U.S. Pat. No. 5,295,196, for a "Method and Apparatus for Currency Discrimination and Counting," which is a continuation-in-part of abandoned U.S. patent application Ser. No. 07/475,111, filed Feb. 5, 1990, for a "Method and Apparatus for Currency Discrimination and Counting." U.S. patent application Ser. No. 08/219,093 is a continuation-in-part of U.S. patent application Ser. No. 08/127,334 filed Sep. 27, 1993, for a "Method and Apparatus for Currency Discrimination and Counting", which is a continuation of U.S. patent application Ser. No. 07/885,648, filed on May 19, 1992, and issued as U.S. Pat. No. 5,295,196, for a "Method and Apparatus for Currency Discrimination and Counting," which is a continuation-in-part of abandoned U.S. patent application Ser. No. 07/475,111, filed Feb. 5, 1990, for a "Method and Apparatus for Currency Discrimination and Counting." U.S. patent application Ser. No. 08/207,592 is a continuation-in-part of U.S. patent application Ser. No. 08/127,334 filed Sep. 27, 1993, for a "Method and Apparatus for Currency Discrimination and Counting", which is a continuation of U.S. patent application Ser. No. 07/885,648, filed on May 19, 1992, and issued as U.S. Pat. No. 5,295,196, for a "Method and Apparatus for Currency Discrimination and Counting," which is a continuation-in-part of abandoned U.S. patent application Ser. No. 07/475,111, filed Feb. 5, 1990, for a "Method and Apparatus for Currency Discrimination and Counting."

BACKGROUND OF THE INVENTION

1. Field of the Invention

The present invention relates, in general, to document identification. More specifically, the present invention relates to an apparatus and method for discriminating among a plurality of document types such as currency bills of different denominations and/or from different countries.

2. Background

A variety of techniques and apparatus have been used to satisfy the requirements of automated currency handling systems. At the lower end of sophistication in this area of technology are systems capable of handling only a specific type of currency, such as a specific dollar denomination, while rejecting all other currency types. At the upper end are complex systems which are capable of identifying and discriminating among and automatically counting multiple currency denominations.

Currency discrimination systems typically employ either magnetic sensing or optical sensing for discriminating among different currency denominations. Magnetic sensing is based on detecting the presence or absence of magnetic ink in portions of the printed indicia on the currency by using magnetic sensors, usually ferrite core-based sensors, and using the detected magnetic signals, after undergoing analog or digital processing, as the basis for currency discrimination. A variety of currency characteristics can be measured using magnetic sensing. These include detection of patterns of changes in magnetic flux, patterns of vertical grid lines in the portrait area of bills, the presence of a security thread, total amount of magnetizable material of a bill, patterns from sensing the strength of magnetic fields along a bill, and other patterns and counts from scanning different portions of the bill such as the area in which the denomination is written out.

The more commonly used optical sensing techniques, on the other hand, are based on detecting and analyzing variations in light reflectance or transmissivity characteristics occurring when a currency bill is illuminated and scanned by a strip of focused light. The subsequent currency discrimination is based on the comparison of sensed optical characteristics with prestored parameters for different currency denominations, while accounting for adequate tolerances reflecting differences among individual bills of a given denomination. A variety of currency characteristics can be measured using optical sensing. These include detection of a bill's density, color, length and thickness, the presence of a security thread and holes, and other patterns of reflectance and transmission. Color detection techniques may employ color filters, colored lamps, and/or dichroic beamsplitters.

In addition to magnetic and optical sensing, other techniques of detecting characteristic information of currency include electrical conductivity sensing, capacitive sensing (such as for watermarks, security threads, thickness, and various dielectric properties) and mechanical sensing (such as for size, limpness, and thickness).

A major obstacle in implementing automated currency discrimination systems is obtaining an optimum compromise between the criteria used to adequately define the characteristic pattern for a particular currency denomination, the time required to analyze test data and compare it to predefined parameters in order to identify the currency bill under scrutiny, and the rate at which successive currency bills may be mechanically fed through and scanned. Even with the use of microprocessors for processing the test data resulting from the scanning of a bill, a finite amount of time is required for acquiring samples and for the process of comparing the test data to stored parameters to identify the denomination of the bill.

Recent currency discriminating systems rely on comparisons between a scanned pattern obtained from a subject bill and sets of stored master patterns for the various denominations among which the system is designed to discriminate. For example, it has been found that scanning U.S. bills of different denominations along a central portion thereof provides scanning patterns sufficiently divergent to enable accurate discrimination between different denominations. Such a discrimination device is disclosed in U.S. Pat. No. 5,295, 196. However, currencies of other countries can differ from U.S. currency and from each other in a number of ways. For example, while all denominations of U.S. currencies are the same size, in many other countries currencies vary in size by denomination. Furthermore, there is a wide variety of bill sizes among different countries. In addition to size, the color of currency can vary by country and by denomination. Likewise, many other characteristics may vary between bills from different countries and of different denominations.

As a result of the wide variety of currencies used throughout the world, a discrimination system designed to handle bills of one country generally can not handle bills from another country. Likewise, the method of discriminating bills of different denominations of one country may not be appropriate for use in discriminating bills of different denominations of another country. For example, scanning for a given characteristic pattern along a certain portion of bills of one country, such as optical reflectance about the central portion of U.S. bills, may not provide optimal discrimination properties for bills of another country, such as German marks.

Furthermore, there is a distinct need for an identification system which is capable of accepting bills of a number of currency systems, that is, a system capable of accepting a number of bill-types. For example, a bank in Europe may need to process on a regular basis French, British, German, Dutch, etc. currency, each having a number of different denomination values.

SUMMARY OF THE INVENTION

It is an object of the present invention to provide an improved method and apparatus for identifying documents.

It is an object of the present invention to provide an improved method and apparatus for discriminating among currency bills comprising a plurality of currency denominations.

It is another object of this invention to provide an improved method and apparatus of the above kind which is capable of efficiently discriminating among bills of several currency denominations at a high speed and with a high degree of accuracy.

It is another object of this invention to provide an improved method and apparatus of the above kind which is capable of efficiently discriminating currencies from a number of different countries.

It is another object of this invention to provide an improved method and apparatus of the above kind which is capable of scanning a document such as a currency bill along two or more laterally displaced segments to thereby identify the document.

It is another object of this invention to provide an improved method and apparatus of the above kind which is capable of scanning a document along two or more laterally displaced segments by using two or more laterally displaced scanheads.

It is another object of this invention to provide an improved method and apparatus of the above kind which is capable of scanning a document along two or more laterally displaced segments by using two or more laterally displaced sensors of a linear array scanhead.

It is another object of this invention to provide an improved method and apparatus of the above kind which is capable of scanning a document along two or more laterally displaced segments by using one or more laterally moveable scanheads.

It is another object of this invention to provide an improved method and apparatus of the above kind wherein the above scanheads or sensors retrieve optical reflectance information from a document under test and use such reflectance information to determine the identity of the document.

It is another object of this invention to provide an improved method and apparatus of the above kind which identifies a document by comparing one or more scanned patterns generated by scanning a document under test with one or more scanheads or one or more sensors and comparing the scanned pattern or patterns with one or more master patterns associated with genuine documents.

It is another object of this invention to provide an improved method and apparatus of the above kind which identifies a document by determining the size of the document.

It is another object of this invention to provide an improved method and apparatus of the above kind which identifies a document by determining the color of the document.

It is another object of this invention to provide an improved method and apparatus of the above kind which identifies a document based on a combination of size information and scanned/master pattern comparison.

It is another object of this invention to provide an improved method and apparatus of the above kind which identifies a document based on a combination of color information and scanned/master pattern comparison.

It is another object of this invention to provide an improved method and apparatus of the above kind which identifies a document based on a combination of size information, color information, and scanned/master pattern comparison.

It is another object of this invention to provide an improved method and apparatus of the above kind in which only selected ones of a number of scanheads or sensors are activated to scan a document.

It is another object of this invention to provide an improved method and apparatus of the above kind in which scanned patterns are generated only from the output or data derived therefrom of selected ones of a number of scanheads or sensors which are activated to scan a document.

It is another object of this invention to provide an improved method and apparatus of the above kind in which the selection of one or more of a number of scanheads or sensors to scan a document is based on size information.

It is another object of this invention to provide an improved method and apparatus of the above kind in which the selection of one or more of a number of scanheads or sensors to scan a document is based on color information.

It is another object of this invention to provide an improved method and apparatus of the above kind in which the lateral positioning of one or more moveable scanheads is based on size and/or color information detected from the document.

It is another object of this invention to provide an improved method and apparatus of the above kind in which the selection of the output or data derived therefrom of one or more of a number of scanheads or sensors for the generation of scanned patterns is based on size information.

It is another object of this invention to provide an improved method and apparatus of the above kind in which the selection of the output or data derived therefrom of one or more of a number of scanheads or sensors for the generation of scanned patterns is based on color information.

It is another object of this invention to provide an improved method and apparatus of the above kind which is capable of scanning either side or both sides of a document.

It is another object of this invention to provide an improved method and apparatus of the above kind in which the amount of information that must be processed is reduced by tailoring the areas from which scanned patterns are derived, such reduction being based on pre-scan information detected from a document such as the size and/or color of a document to be scanned.

It is another object of this invention to provide an improved method and apparatus of the above kind in which the amount of information that must be processed is reduced by tailoring the data which must be assembled into one or more scanned patterns, such reduction being based on information detected from a document during the scanning process itself, the information detected during the scanning process itself including, for example, size and/or color information.

It is another object of this invention to provide an improved method and apparatus of the above kind in which size and/or color information detected from a document is used to generate a preliminary set of potentially matching documents and in which one or more scanned patterns generated from a document are compared with master patterns chosen from the preliminary set.

It is another object of this invention to provide an improved method and apparatus of the above kind in which a document to be scanned is transported past one or more scanheads in a centered or justified manner along a transport path.

It is another object of this invention to provide an improved method and apparatus of the above kind in which a document to be scanned is transported past one or more scanheads along a transport path and in which one or more sensors separate from the one or more scanheads are used to determine the lateral positioning of the document within the transport path.

It is another object of this invention to provide an improved method and apparatus of the above kind in which a document to be scanned is transported past one or more scanheads along a transport path and in which the lateral positioning of the document within the transport path is determined by analyzing of output of one or more scanheads.

It is another object of this invention to provide an improved method and apparatus of the above kind in which a document to be scanned is transported past one or more scanheads along a transport path and in which the skew of the document is determined by analyzing of output of one or more scanheads or analyzing the output of one or more separate sensors.

It is another object of this invention to provide an improved method and apparatus of the above kind which is capable of accepting documents fed either face up or face down.

It is another object of this invention to provide an improved method and apparatus of the above kind which is capable of accepting documents fed in either the forward or reverse direction, i.e., top edge first or top edge last.

A related object of the present invention is to provide such an improved currency discrimination and counting apparatus which is compact, economical, and has uncomplicated construction and operation.

Briefly, in accordance with the present invention, the objectives enumerated above are achieved by scanning a document along one or more segments, generating one or more scanned patterns therefrom, and comparing the one or more scanned patterns to one or more master patterns associated with scans along corresponding segments of genuine documents. A preferred embodiment of the present invention involves a technique based on the optical sensing of reflectance characteristics obtained by illuminating and scanning a document such as a currency bill along an appropriately selected segment or segments of a document. Light reflected from the bill as it is optically scanned is detected and used as an analog representation of the variation in the dark and light content of the printed pattern or indicia on the bill surface.

A series of such detected reflectance signals are obtained by sampling and digitally processing, under microprocessor control, the reflected light at a plurality of predefined sample points as the bill is moved across the illuminated strip. Accordingly, a fixed number of reflectance samples is obtained across the note. The data samples obtained for a bill scan are subjected to digital processing, including a normalizing process to deaccentuate variations due to contrast fluctuations in the printed pattern or indicia existing on the surface of the bill being scanned. The normalized reflectance data represent a characteristic pattern that is fairly unique for a given bill identity and incorporates sufficient distinguishing features between characteristic patterns for different bill-types so as to accurately differentiate therebetween.

By using the above approach, a series of master characteristic patterns are generated and stored using standard bills for each denomination of currency that is to be detected. The "standard" bills used to generate the master characteristic patterns are preferably bills that are slightly used bills. According to a preferred embodiment, two or four characteristic patterns are generated and stored within system memory for each detectable bill-type. The stored patterns correspond, respectively, to optical scans performed on one or both sides of a bill along "forward" and "reverse" directions relative to the pattern printed on the bill. For bills which produce significant pattern changes when shifted slightly to the left or right, such as the $10 bill in U.S. currency, it is preferred to store two patterns for each of the "forward" and "reverse" directions, each pair of patterns for the same direction represent two scan areas that are slightly displaced from each other along the lateral dimension of the bill. Preferably, the document identification system of this invention is adapted to identify different denominations of a plurality of currency systems. Accordingly, a master set of different characteristic patterns is stored within the system memory for subsequent correlation purposes.

According to the correlation technique of this invention, the pattern generated by scanning a bill under test and processing the sampled data is compared with each of the prestored characteristic patterns within a preliminary set (to be described below) to generate, for each comparison, a correlation number representing the extent of similarity between corresponding ones of the plurality of data samples for the compared patterns. Bill identification is based on designating the scanned bill as belonging to the bill-type corresponding to the stored characteristic pattern for which the correlation number resulting from pattern comparison is determined to be the highest. The possibility of a scanned bill having its identity mischaracterized following the comparison of characteristic patterns is significantly reduced by defining a bi-level threshold of correlation that must be satisfied for a "positive" call to be made.

In essence, the present invention utilizes an optical sensing and correlation technique for positively identifying any of a plurality of different bill-types regardless of whether the bill is scanned along the "forward" or "reverse" directions. Likewise in a preferred embodiment of the present invention, the system is capable of identifying any of a plurality of different bill-types regardless of whether the bill is fed into the system with a "face up" or "face down"

orientation. Face orientation can be accommodated by storing master patterns scanned from both sides of genuine documents, using a system having one or more scanheads on a single side of a document transport path, and comparing scanned patterns to master patterns retrieved from both sides of genuine documents. Alternatively, scanheads may be placed on both sides of a document transport path, scanned patterns retrieved from respective sides can be compared to master patterns from both sides or master patterns from corresponding sides where face orientation can be determined. Additionally, a cross check can be performed so that the identity determined by a match of patterns from one side of a document is consistent with the identity indicated by comparing patterns from the other side of the document. For both one-sided and two-sided scanhead systems, where the face orientation of a document can be determined before patterns are compared, scanned patterns from one side of a document can be compared only to master patterns retrieved from a corresponding side. Similar methods can be employed for accommodating documents fed in forward and reverse directions.

In a preferred embodiment, the invention is particularly adapted to be implemented with a system programmed to track each identified currency identity so as to conveniently present aggregate totals for bills that have been identified at the end of a scan run. A preferred embodiment incorporates an abbreviated curved transport path for accepting currency bills that are to be counted and transporting the bills about their narrow dimension across a scanhead located downstream of the curved path and onto a conventional stacking station where sensed and counted bills are collected. In a preferred embodiment, a scanhead of the present invention operates in conjunction with an optical encoder which is adapted to initiate the capture of a predefined number of reflectance data samples when a bill (and, thus, the indicia or pattern printed thereupon) moves across a coherent strip of light focused by the scanhead.

In a preferred embodiment, a scanhead of the present invention uses a pair of light-emitting diodes ("LEDs") to focus a coherent light strip of predefined dimensions and having a normalized distribution of light intensity across the illuminated area. The LEDs are angularly disposed and focus the desired strip of light onto the narrow dimension of a bill positioned flat across the scanning surface of the scanhead. A photodetector detects light reflected from the bill. The sampling of the photodetector output is controlled by the optical encoder to obtain the desired reflectance samples. Initiation of sampling is based upon detection of the edge of a bill.

The above described techniques and apparatus as tailored to scanning U.S. currency are more fully disclosed in U.S. Pat. No. 5,295,196, for a "Method and Apparatus for Currency Discrimination and Counting" incorporated herein in its entirety.

In adapting the currency discriminating method and apparatus disclosed in U.S. Pat. No. 5,295,196 to optimize the scanning of currencies from countries other than the United States, it is first noted that while it has been found that scanning along the central portion of the green side of U.S. bills provides good patterns to discriminate between the different U.S. denominations, foreign bills may require scanning along segments located in locations other than the center and the desirable areas to scan bills can vary from bill-type to bill-type. For example, it may be determined that it is desirable to scan German marks in the forward direction along a segment 1 inch (2.54 cm) to the left of center along the top face of a bill while it may be desirable to scan British pounds along a segment 1.5 inches (3.81 cm) to the right of center. To provide a system capable of scanning along a plurality of laterally displaced segments, the present invention utilizes either a plurality of laterally displaced stationary scanheads, one or more laterally moveable scanheads, or a linear array scanhead having a plurality of laterally displaced sensors. In a preferred embodiment, the scanheads or sensors are arranged in a symmetrical manner about the center of document to be scanned. Such a symmetrical arrangement aids in providing a system which is capable of accepting bills fed in both the forward and reverse directions.

Additionally, while all denominations of U.S. currency have the same size, currencies from other countries may vary in size from country to country as well as from denomination to denomination for currency from the same country. In a preferred embodiment of the present invention, variance in size is accommodated by incorporating means for determining the size of a document. These size determining means may include sensors separate from the scanheads or scanning sensors discussed above or alternatively, in some preferred embodiments of the present invention, may include the scanheads or scanning sensors discussed above which are used for the retrieval of scanned characteristic patterns. Based on the size information retrieved from a bill, selected scanheads may be activated, laterally moveable scanheads may be appropriately positioned and activated, and/or selected sensors in a linear array scanhead may be activated to permit scanning along appropriate segments of a bill based on its size. Alternatively, all scanheads or scanning sensors may be activated and the output of appropriately positioned scanheads or scanning sensors may be processed to generate scanned patterns based on the size of a bill. Furthermore, based on the size of a bill, a preliminary determination can be made as to which of a plurality of genuine bill-types a bill under test may potentially match. Based on such a preliminary determination, the comparison of generated scanned patterns can be limited to only master patterns associated with bill-types chosen from the preliminary set of potentially matching bills.

Likewise, the transport mechanism which transports documents to be scanned past the above described scanheads may be designed to transport documents in a centered manner, left or right justified manner, in a non-controlled lateral positioned manner, in a non-skewed manner, or in a skewed manner. Sensors separate and distinct from the above described scanheads or the above described scanheads themselves may be used to determine the lateral positioning of transported bills and/or their degree of skew. Based on a determination of the laterally positioning of a bill and/or its skew, appropriately positioned scanheads or scanning sensors may be activated or laterally moveable scanheads may be appropriately positioned and activated or the output from appropriately positioned scanheads or scanning sensors may be processed to generate scanned patterns based on the lateral positioning and/or skew of the bill.

Additionally, while all denominations of U.S. currency have the same colors (a "green" side and a "black" side), currencies from other countries may vary in color from country to country as well as from denomination to denomination for currency from the same country. In a preferred embodiment of the present invention, variance in color is accommodated by incorporating means for determining the color of a document. These color determining means may include sensors separate from the scanheads or sensors discussed above or alternatively, in some preferred embodiments of the present invention, may include the appropriately modified scanheads or sensors discussed above which are used for the retrieval of scanned characteristic patterns. For example, colored filters may be placed in front of the above described scanheads or sensors. Based on the color information retrieved from a bill, selected scanheads may be activated, laterally moveable scanheads may be appropriately positioned and activated, and/or selected sensors in a linear array scanhead may be activated to permit scanning along appropriate segments of a bill based on its color. Alternatively, all scanheads or scanning sensors may be activated and the output of appropriately positioned scanheads or scanning sensors may be processed to generate scanned patterns based on the color of a bill. Furthermore, based on the color of a bill, a preliminary determination can be made as to which of a plurality of genuine bill-types a bill under test may potentially match. Based on such a preliminary determination, the comparison of generated scanned patterns can be limited to only master patterns associated with bill-types chosen from the preliminary set of potentially matching bills.

In a preferred embodiment of the present invention, both color and size information may be utilized as described above.

In a preferred embodiment of the present invention, scanheads are positioned on both sides of a document transport path so as to permit scanning of either or both sides of a document.

BRIEF DESCRIPTION OF THE DRAWINGS

Other objects and advantages of the invention will become apparent upon reading the following detailed description in conjunction with the drawings in which:

FIG. 3A is a block diagram illustrating a preferred circuit arrangement for processing and correlating reflectance data according to the optical sensing and counting technique of this invention;

FIG. 3B is a block diagram illustrating a circuit arrangement for producing a reset signal;

DETAILED DESCRIPTION OF THE PREFERRED EMBODIMENTS

According to a preferred embodiment of the present invention, multiple scanheads per side are used to scan a bill. Nonetheless, before explaining such a multiple head scanner, the operation of a scanner having a single scanhead is first described. In particular, a currency discrimination system adapted to U.S. currency is described in connection with FIGS. 1–3. Subsequently, modifications to such a discrimination system will be described in obtaining a currency discrimination system in accordance with the present invention. Furthermore, while the preferred embodiments below entail the scanning of currency bills, the system of the present invention is applicable to other documents as well. For example, the system of the present invention may be employed in conjunction with stock certificates, bonds, and postage and food stamps.

Figure 1:
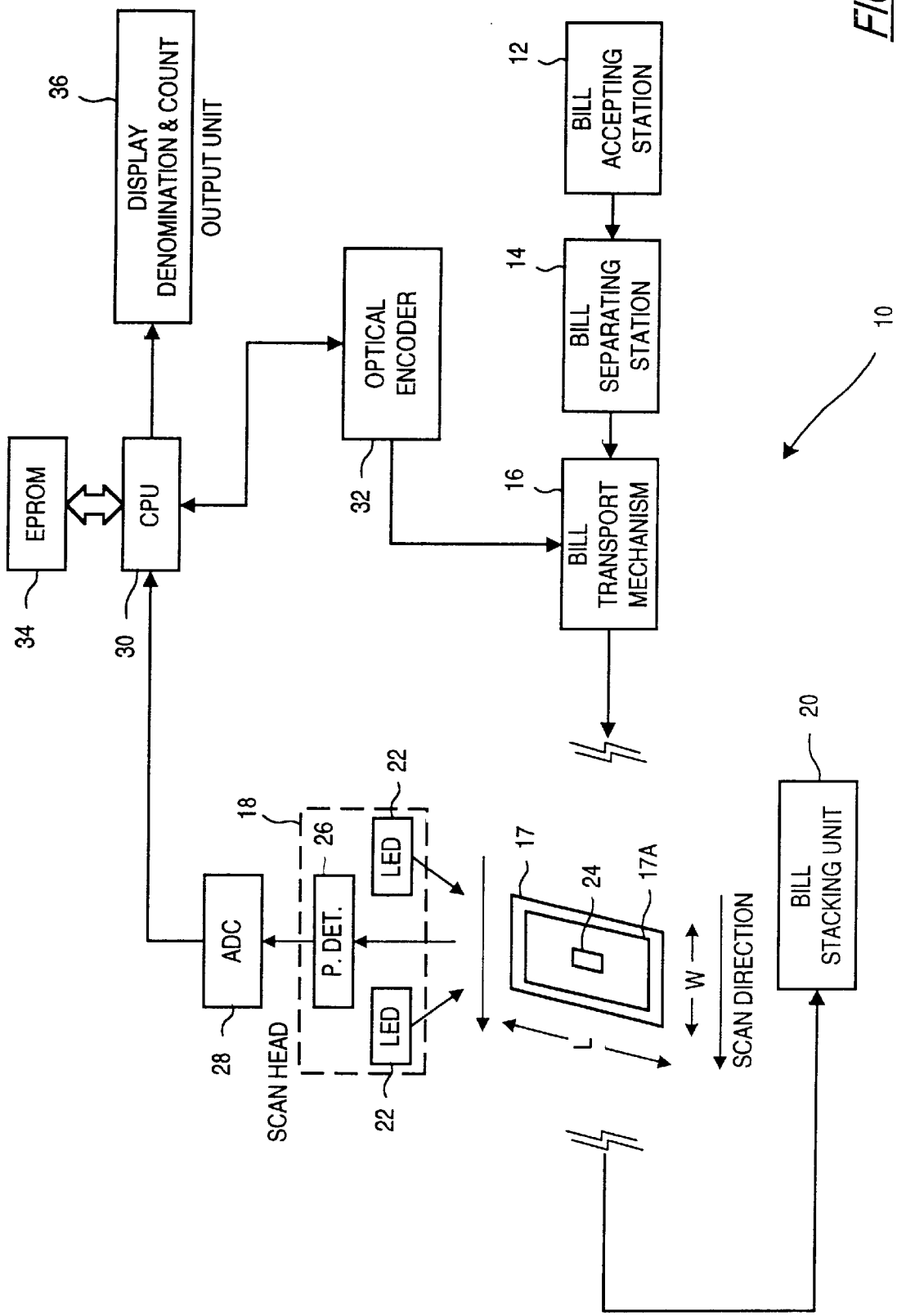
FIG. 1 is a functional block diagram illustrating a currency discriminating system having a single scanhead.

Referring now to FIG. 1, there is shown a functional block diagram illustrating a currency discriminating system having a single scanhead. The system 10 includes a bill accepting station 12 where stacks of currency bills that need to be identified and counted are positioned. Accepted bills are acted upon by a bill separating station 14 which functions to pick out or separate one bill at a time for being sequentially relayed by a bill transport mechanism 16, according to a precisely predetermined transport path, across scanhead 18 where the currency denomination of the bill is scanned and identified. Scanhead 18 is an optical scanhead that scans for characteristic information from a scanned bill 17 which is used to identify the denomination of the bill. The scanned bill 17 is then transported to a bill stacking station 20 where bills so processed are stacked for subsequent removal.

The optical scanhead 18 of FIG. 1 comprises at least one light source 22 directing a beam of coherent light downwardly onto the bill transport path so as to illuminate a substantially rectangular light strip 24 upon a currency bill 17 positioned on the transport path below the scanhead 18. Light reflected off the illuminated strip 24 is sensed by a photodetector 26 positioned directly above the strip. The analog output of photodetector 26 is converted into a digital signal by means of an analog-to-digital (ADC) convertor unit 28 whose output is fed as a digital input to a central processing unit (CPU) 30.

While scanhead 18 of FIG. 1 is an optical scanhead, it should be understood that it may be designed to detect a variety of characteristic information from currency bills. Additionally, the scanhead may employ a variety of detection means such as magnetic, optical, electrical conductivity, and capacitive sensors. Use of such sensors is discussed in more detail U.S. patent application Ser. No. 08/219,093 filed on Mar. 29, 1994 for a "Currency Discriminator and Authenticator" and incorporated herein by reference.

Referring again to FIG. 1, the bill transport path is defined in such a way that the transport mechanism 16 moves currency bills with the narrow dimension of the bills being parallel to the transport path and the scan direction. Alternatively, the system 10 may be designed to scan bills along their long dimension or along a skewed dimension. As a bill 17 moves on the transport path on the scanhead 18, the coherent light strip 24 effectively scans the bill across the narrow dimension of the bill. As depicted, the transport path is so arranged that a currency bill 17 is scanned by scanhead 18 approximately about the central section of the bill along its narrow dimension, as shown in FIG. 1. The scanhead 18 functions to detect light reflected from the bill as it moves across the illuminated light strip 24 and to provide an analog representation of the variation in light so reflected which, in turn, represents the variation in the dark and light content of the printed pattern or indicia on the surface of the bill. This variation in light reflected from the narrow dimension scanning of the bills serves as a measure for distinguishing, with a high degree of confidence, among a plurality of currency denominations which the system of this invention is programmed to handle.

A series of such detected reflectance signals are obtained across the narrow dimension of the bill, or across a selected segment thereof, and the resulting analog signals are digitized under control of the CPU 30 to yield a fixed number of digital reflectance data samples. The data samples are then subjected to a digitizing process which includes a normalizing routine for processing the sampled data for improved correlation and for smoothing out variations due to contrast fluctuations in the printed pattern existing on the bill surface. The normalized reflectance data so digitized represents a characteristic pattern that is fairly unique for a given bill denomination and provides sufficient distinguishing features among characteristic patterns for different currency denominations. This process is more fully explained in U.S. patent application Ser. No. 07/885,648, filed on May 19, 1992, now issued as U.S. Pat. No. 5,295,196 for a "Method and Apparatus for Currency Discrimination and Counting," which is incorporated herein by reference in its entirety.

In order to ensure strict correspondence between reflectance samples obtained by narrow dimension scanning of successive bills, the initiation of the reflectance sampling process is preferably controlled through the CPU 30 by means of an optical encoder 32 which is linked to the bill transport mechanism 16 and precisely tracks the physical movement of the bill 17 across the scanhead 18. More specifically, the optical encoder 32 is linked to the rotary motion of the drive motor which generates the movement imparted to the bill as it is relayed along the transport path. In addition, the mechanics of the feed mechanism (not shown, see U.S. Pat. No. 5,295,196 referred to above) ensure that positive contact is maintained between the bill and the transport path, particularly when the bill is being scanned by scanhead 18. Under these conditions, the optical encoder 32 is capable of precisely tracking the movement of the bill 17 relative to the light strip 24 generated by the scanhead 18 by monitoring the rotary motion of the drive motor.

The output of photodetector 26 is monitored by the CPU 30 to initially detect the presence of the bill underneath the scanhead 18 and, subsequently, to detect the starting point of the printed pattern on the bill, as represented by the thin borderline 17A which typically encloses the printed indicia on currency bills. Once the borderline 17A has been detected, the optical encoder 32 is used to control the timing and number of reflectance samples that are obtained from the output of the photodetector 26 as the bill 17 moves across the scanhead 18 and is scanned along its narrow dimension.

The use of the optical encoder 32 for controlling the sampling process relative to the physical movement of a bill 17 across the scanhead 18 is also advantageous in that the encoder 32 can be used to provide a predetermined delay following detection of the borderline prior to initiation of samples. The encoder delay can be adjusted in such a way that the bill 17 is scanned only across those segments along its narrow dimension which contain the most distinguishable printed indicia relative to the different currency denominations.

In the case of U.S. currency, for instance, it has been determined that the central, approximately two-inch (approximately 5 cm) portion of currency bills, as scanned across the central section of the narrow dimension of the bill, provides sufficient data for distinguishing among the various U.S. currency denominations on the basis of the correlation technique disclosed in U.S. Pat. No. 5,295,196 referred to above. Accordingly, the optical encoder can be used to control the scanning process so that reflectance samples are taken for a set period of time and only after a certain period of time has elapsed since the borderline 17A has been detected, thereby restricting the scanning to the desired central portion of the narrow dimension of the bill.

Figure 2A:
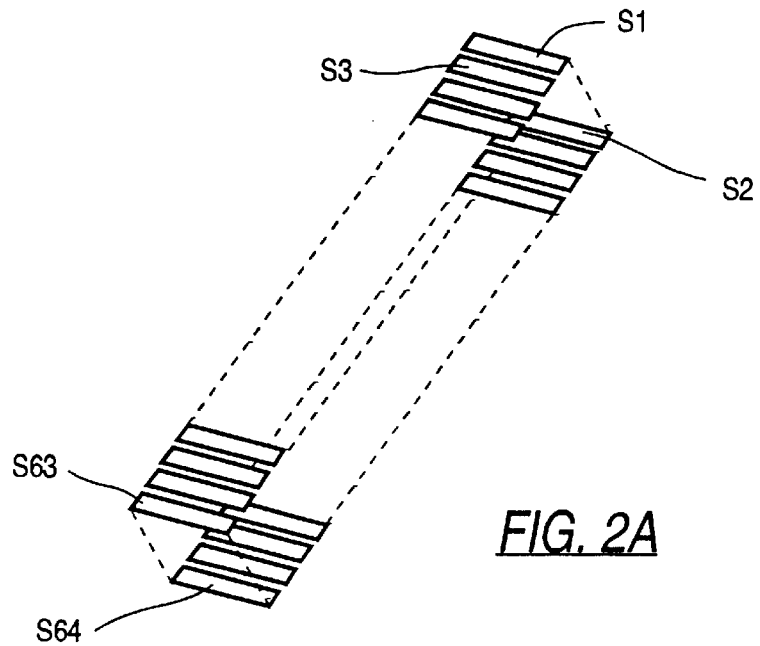
FIG. 2A is a diagrammatic perspective illustration of the successive areas scanned during the traversing movement of a single bill across an optical sensor according to a preferred embodiment of the present invention.
Figure 2B:
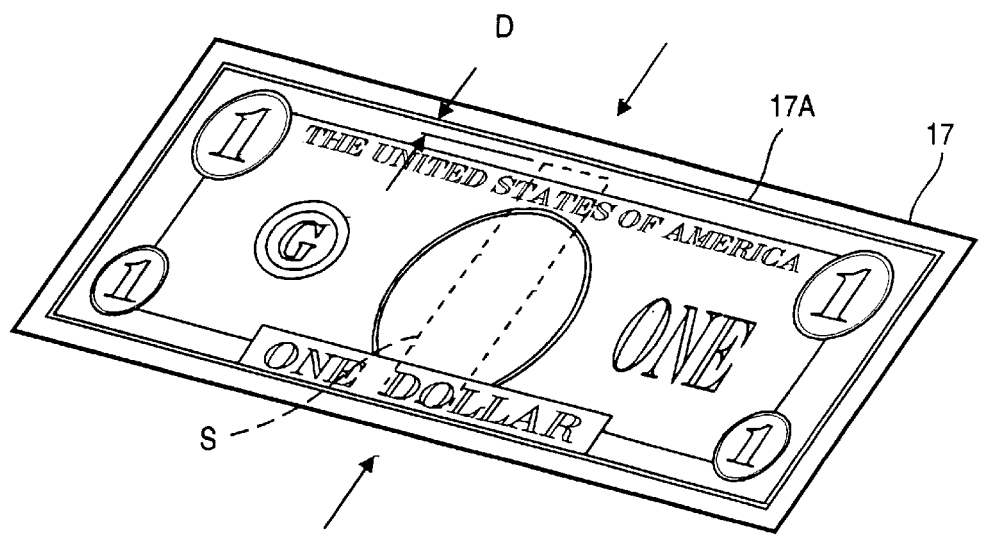
FIG. 2B is a perspective view of a bill and a preferred area to be optically scanned on the bill.
Figure 2C:
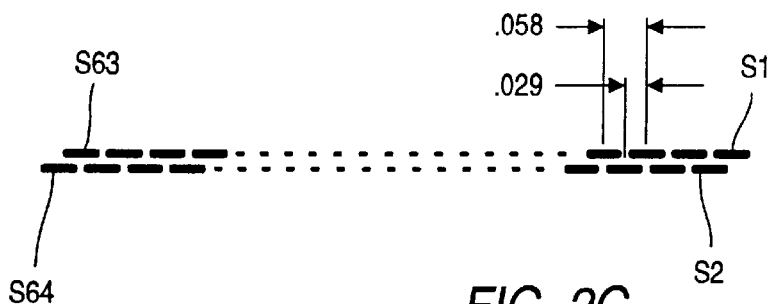
FIG. 2C is a diagrammatic side elevation view of the scan area to be optically scanned on a bill according to a preferred embodiment of the present invention.

FIGS. 2A–2C illustrate the scanning process of scanhead 20 in more detail. Referring to FIG. 2B, as a bill 17 is advanced in a direction parallel to the narrow edges of the bill, scanning via a wide slit in the scanhead 18 is effected along a segment S of the central portion of the bill 17. This segment S begins a fixed distance D inboard of the borderline 17A. As the bill 17 traverses the scanhead 18, a strip s of the segment S is always illuminated, and the photodetector 26 produces a continuous output signal which is proportional to the intensity of the light reflected from the illuminated strip s at any given instant. This output is sampled at intervals controlled by the encoder, so that the sampling intervals are precisely synchronized with the movement of the bill across the scanhead 18.

As illustrated in FIGS. 2A and 2C, it is preferred that the sampling intervals be selected so that the strips s that are illuminated for successive samples overlap one another. The odd-numbered and even-numbered sample strips have been separated in FIGS. 2A and 2C to more clearly illustrate this overlap. For example, the first and second strips s1 and s2 overlap each other, the second and third strips s2 and s3 overlap each other, and so on. Each adjacent pair of strips overlap each other. For U.S. currency, this is accomplished by sampling strips that are 0.050 inch (0.127 cm) wide at 0.029 inch (0.074 cm) intervals, along a segment S that is 1.83 inch (4.65 cm) long (64 samples).

The optical sensing and correlation technique is based upon using the above process to generate a series of stored intensity signal patterns using genuine bills for each denomination of currency that is to be detected. According to a preferred embodiment, two or four sets of master intensity signal samples are generated and stored within system memory, preferably in the form of an EPROM 34 (see FIG. 1), for each detectable currency denomination. The sets of master intensity signal samples for each bill are generated from optical scans, performed on the green surface of the bill and taken along both the "forward" and "reverse" directions relative to the pattern printed on the bill. Alternatively, the optical scanning may be performed on the black side of U.S. currency bills or on either surface of bills from other countries. Additionally, the optical scanning may be performed on both sides of a bill, for example, by placing a scanhead on each side of the bill transport path as described in more detail in co-pending U.S. patent application Ser. No. 08/207,592 filed Mar. 8, 1994, for a "Method and Apparatus for Currency Discrimination" and incorporated herein by reference.

In adapting this technique to U.S. currency, for example, sets of stored intensity signal samples are generated and stored for seven different denominations of U.S. currency, i.e., $1, $2, $5, $10, $20, $50 and $100. For bills which produce significant pattern changes when shifted slightly to the left or right, such as the $2 and the $10 bill in U.S. currency, it is preferred to store two patterns for each of the "forward" and "reverse" directions, each pair of patterns for the same direction represent two scan areas that are slightly displaced from each other along the long dimension of the bill. Accordingly, a set of 18 different master characteristic patterns is stored within the system memory for subsequent correlation purposes (four master patterns for the $2 and the $10 bill and two master patterns for each of the other denominations). Once the master patterns have been stored, the pattern generated by scanning a bill under test is compared by the CPU 30 with each of the 18 master patterns of stored intensity signal samples to generate, for each comparison, a correlation number representing the extent of correlation, i.e., similarity between corresponding ones of the plurality of data samples, for the sets of data being compared.

The CPU 30 is programmed to identify the denomination of the scanned bill as corresponding to the set of stored intensity signal samples for which the correlation number resulting from pattern comparison is found to be the highest. In order to preclude the possibility of mischaracterizing the denomination of a scanned bill, as well as to reduce the possibility of spurious notes being identified as belonging to a valid denomination, a bi-level threshold of correlation is used as the basis for making a "positive" call. Such a method is disclosed in U.S. Pat. No. 5,295,196 referred to above. If a "positive" call can not be made for a scanned bill, an error signal is generated.

Using the above sensing and correlation approach, the CPU 30 is programmed to count the number of bills belonging to a particular currency denomination as part of a given set of bills that have been scanned for a given scan batch, and to determine the aggregate total of the currency amount represented by the bills scanned during a scan batch. The CPU 30 is also linked to an output unit 36 (FIG. 1) which is adapted to provide a display of the number of bills counted, the breakdown of the bills in terms of currency denomination, and the aggregate total of the currency value represented by counted bills. The output unit 36 can also be adapted to provide a print-out of the displayed information in a desired format.

Referring now to FIG. 3A, there is shown a representation, in block diagram form, of a preferred circuit arrangement for processing and correlating reflectance data according to the system of this invention. As shown therein, the CPU 30 accepts and processes a variety of input signals including those from the optical encoder 32, the photodetector 26 and a memory unit 38, which can be an erasable programmable read only memory (EPROM). The memory unit 38 has stored within it the correlation program on the basis of which patterns are generated and test patterns compared with stored master programs in order to identify the denomination of test currency. A crystal 40 serves as the time base for the CPU 30, which is also provided with an external reference voltage $V_{REF}$ on the basis of which peak detection of sensed reflectance data is performed.

The CPU 30 also accepts a timer reset signal from a reset unit 44 which, as shown in FIG. 3B, accepts the output voltage from the photodetector 26 and compares it, by means of a threshold detector 44A, relative to a pre-set voltage threshold, typically 5.0 volts, to provide a reset signal which goes "high" when a reflectance value corresponding to the presence of paper is sensed. More specifically, reflectance sampling is based on the premise that no portion of the illuminated light strip (24 in FIG. 1) is reflected to the photodetector in the absence of a bill positioned below the scanhead. Under these conditions, the output of the photodetector represents a "dark" or "zero" level reading. The photodetector output changes to a "white" reading, typically set to have a value of about 5.0 volts, when the edge of a bill first becomes positioned below the scanhead and falls under the light strip 24. When this occurs, the reset unit 44 provides a "high" signal to the CPU 30 and marks the initiation of the scanning procedure.

The machine-direction dimension, that is, the dimension parallel to the direction of bill movement, of the illuminated strip of light produced by the light sources within the scanhead is set to be relatively small for the initial stage of the scan when the thin borderline is being detected. The use of the narrow slit increases the sensitivity with which the reflected light is detected and allows minute variations in the "gray" level reflected off the bill surface to be sensed. This is important in ensuring that the thin borderline of the pattern, i.e., the starting point of the printed pattern on the bill, is accurately detected. Once the borderline has been detected, subsequent reflectance sampling is performed on the basis of a relatively wider light strip in order to completely scan across the narrow dimension of the bill and obtain the desired number of samples, at a rapid rate. The use of a wider slit for the actual sampling also smooths out the output characteristics of the photodetector and realizes the relatively large magnitude of analog voltage which is essential for accurate representation and processing of the detected reflectance values.

Returning to FIG. 3A, the CPU 30 processes the output of photodetector 26 through a peak detector 50 which essentially functions to sample the photodetector output voltage and hold the highest, i.e., peak, voltage value encountered after the detector has been enabled. For U.S. currency, the peak detector is also adapted to define a scaled voltage on the basis of which the pattern borderline on bills is detected. The output of the peak detector 50 is fed to a voltage divider 54 which lowers the peak voltage down to a scaled voltage $V_S$ representing a predefined percentage of this peak value. The voltage $V_S$ is based upon the percentage drop in output voltage of the peak detector as it reflects the transition from the "high" reflectance value resulting from the scanning of the unprinted edge portions of a currency bill to the relatively lower "gray" reflectance value resulting when the thin borderline is encountered. Preferably, the scaled voltage $V_S$ is set to be about 70–80 percent of the peak voltage.

The scaled voltage $V_S$ is supplied to a line detector 56 which is also provided with the incoming instantaneous output of the photodetector 26. The line detector 56 compares the two voltages at its input side and generates a signal $L_{DET}$ which normally stays "low" and goes "high" when the edge of the bill is scanned. The signal $L_{DET}$ goes "low" when the incoming photodetector output reaches the pre-defined percentage of the peak photodetector output up to that point, as represented by the voltage $V_S$. Thus, when the signal $L_{DET}$ goes "low", it is an indication that the borderline of the bill pattern has been detected. At this point, the CPU 30 initiates the actual reflectance sampling under control of the encoder 32 (see FIG. 3A) and the desired fixed number of reflectance samples are obtained as the currency bill moves across the illuminated light strip and is scanned along the central section of its narrow dimension.

When master characteristic patterns are being generated, the reflectance samples resulting from the scanning of one or more genuine bills for each denomination are loaded into corresponding designated sections within a system memory 60, which is preferably an EPROM. The loading of samples is accomplished through a buffered address latch 58, if necessary. During currency discrimination, the reflectance values resulting from the scanning of a test bill are sequentially compared, under control of the correlation program stored within the memory unit 38, with each of the corresponding master characteristic patterns stored within the EPROM 60, again through the address latch 58. The procedure for scanning bills and generating characteristic patterns is described in U.S. Pat. No. 5,295,196 referred to above and incorporated by reference in its entirety and co-pending U.S. patent application Ser. No. 08/243,807, filed on May 16, 1994 and entitled "Method and Apparatus for Currency Discrimination."

The optical sensing and correlation technique described in U.S. Pat. No. 5,295,196 permits identification of pre-programmed currency denominations with a high degree of accuracy and is based upon a relatively short processing time for digitizing sampled reflectance values and comparing them to the master characteristic patterns. The approach is used to scan currency bills, normalize the scanned data and generate master patterns in such a way that bill scans during operation have a direct correspondence between compared sample points in portions of the bills which possess the most distinguishable printed indicia. A relatively low number of reflectance samples is required in order to be able to adequately distinguish among several currency denominations.

Now that a single scanhead currency scanner has been described in connection with scanning U.S. currency, the currency discrimination system of the present invention will be described.

Figure 4:
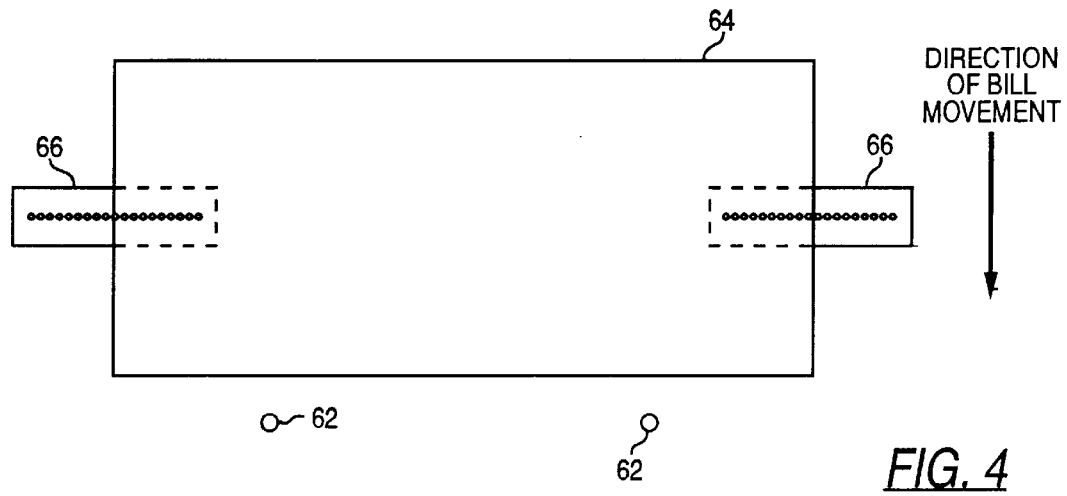
FIG. 4 is a top view of a bill and size determining sensors according to a preferred embodiment of the present invention.

First of all, because currencies come in a variety of sizes, sensors are added to determine the size of a bill to be scanned. These sensors are placed upstream of the scanheads to be described below. A preferred embodiment of size determining sensors is illustrated in FIG. 4. Two leading/trailing edge sensors 62 detect the leading and trailing edges of a bill 64 as it passing along the transport path. These sensors in conjunction with the encoder 32 (FIG. 1) may be used to determine the dimension of the bill along a direction parallel to the scan direction which in FIG. 4 is the narrow dimension (or width) of the bill 64. Additionally, two side edge sensors 66 are used to detect the dimension of a bill 64 transverse to the scan direction which in FIG. 4 is the wide dimension (or length) of the bill 64. While the sensors 62 and 66 of FIG. 4 are optical sensors, any means of determining the size of a bill may be employed.

Once the size of a bill is determined, the potential identity of the bill is limited to those bills having the same size. Accordingly, the area to be scanned can be tailored to the area or areas best suited for identifying the denomination and country of origin of a bill having the measured dimensions.

Figure 5:
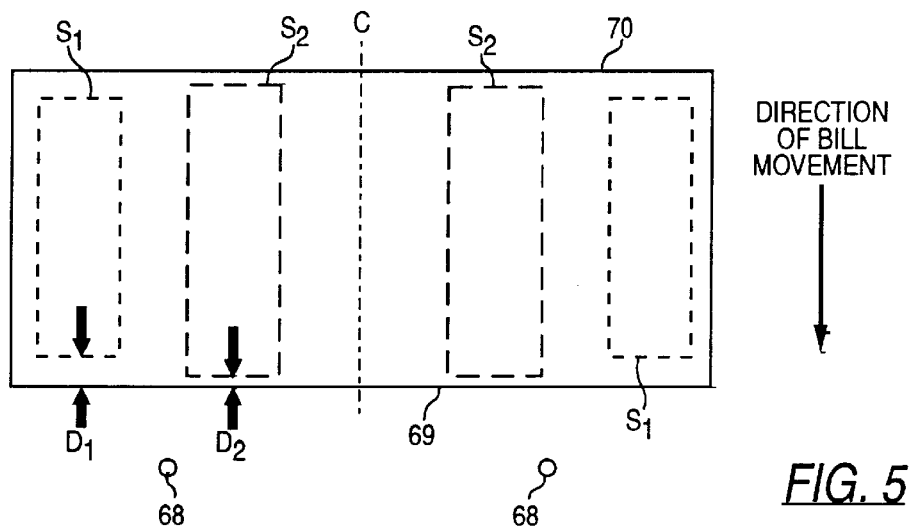
FIG. 5 is a top view of a bill illustrating multiple areas to be optically scanned on a bill according to a preferred embodiment of the present invention.

Secondly, while the printed indicia on U.S. currency is enclosed within a thin borderline, the sensing of which may serve as a trigger to begin scanning using a wider slit, most currencies of other currency systems such as those from other countries do not have such a borderline. Thus the system described above may be modified to begin scanning relative to the edge of a bill for currencies lacking such a borderline. Referring to FIG. 5, two leading edge detectors 68 are shown. The detection of the leading edge 69 of a bill 70 by leading edge sensors 68 triggers scanning in an area a given distance away from the leading edge of the bill 70, e.g., $D_1$ or $D_2$, which may vary depending upon the preliminary indication of the identity of a bill based on the dimensions of a bill. Alternatively, the leading edge 69 of a bill may be detected by one or more of the scanheads (to be described below) in a similar manner as that described with respect to FIGS. 3A and 3B. Alternatively, the beginning of scanning may be triggered by positional information provided by the encoder 32 of FIG. 1, for example, in conjunction with the signals provided by sensors 62 of FIG. 4, thus eliminating the need for leading edge sensors 68.

Figure 6A:
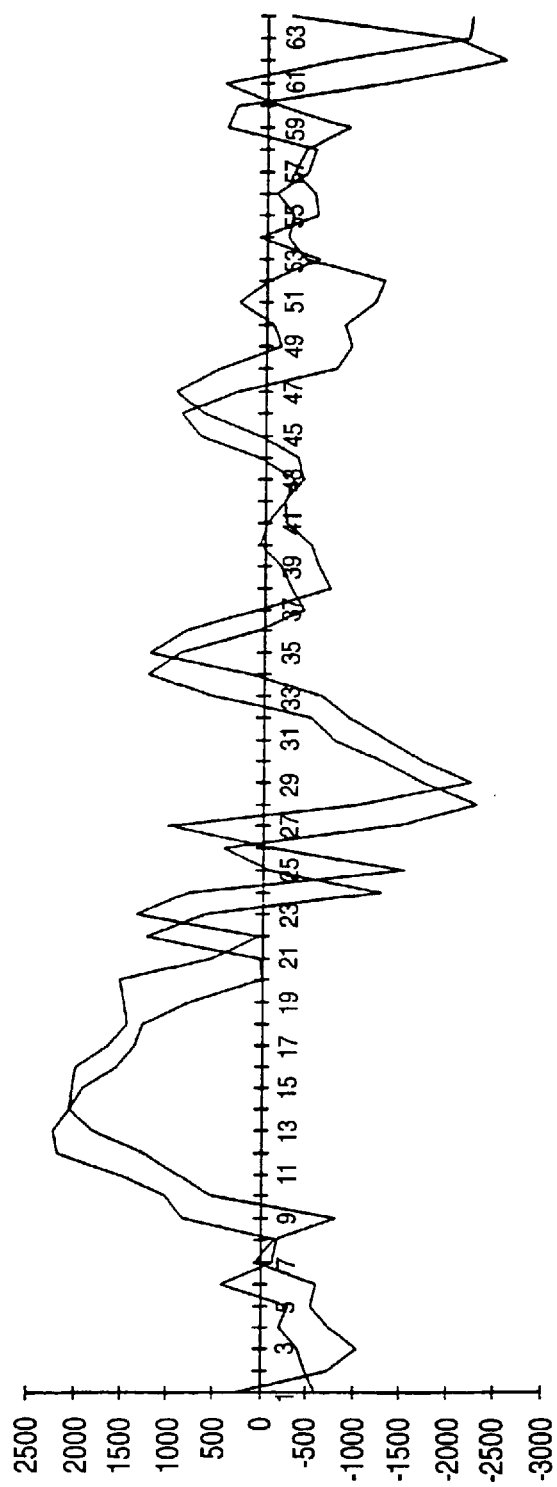
FIG. 6A is a graph illustrating a scanned pattern which is offset from a corresponding master pattern.
Figure 6B:
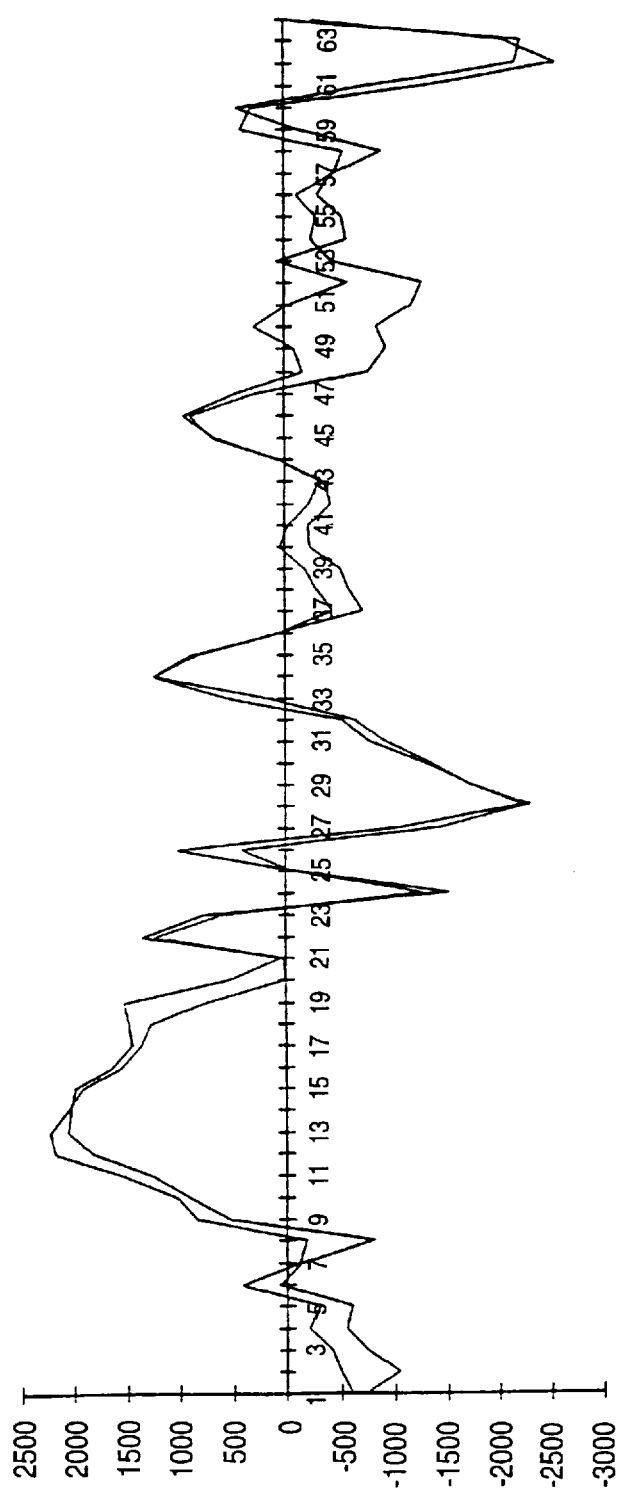
FIG. 6B is a graph illustrating the same patterns of FIG. 6A after the scanned pattern is shifted relative to the master pattern.

However, when the initiation of scanning is triggered by the detection of the leading edge of a bill, the chance that a scanned pattern will be offset relative to a corresponding master pattern increases. Offsets can result from the existence of manufacturing tolerances which permit the location of printed indicia of a document to vary relative to the edges of the document. For example, the printed indicia on U.S. bills may vary relative to the leading edge of a bill by as much as 50 mils which is 0.05 inches (1.27 mm). Thus when scanning is triggered relative to the edge of a bill (rather than the detection of a certain part of the printed indicia itself, such as the printed borderline of U.S. bills), a scanned pattern can be offset from a corresponding master pattern by one or more samples. Such offsets can lead to erroneous rejections of genuine bills due to poor correlation between scanned and master patterns. To compensate, overall scanned patterns and master patterns can be shifted relative to each other as illustrated in FIGS. 6A and 6B. More particularly, FIG. 6A illustrates a scanned pattern which is offset from a corresponding master pattern. FIG. 6B illustrates the same patterns after the scanned pattern is shifted relative to the master pattern, thereby increasing the correlation between the two patterns. Alternatively, instead of shifting either scanned patterns or master patterns, master patterns may be stored in memory corresponding to different offset amounts.

Thirdly, while it has been determined that the scanning of the central area on the green side of a U.S. bill (see segment S of FIG. 2B) provides sufficiently distinct patterns to enable discrimination among the plurality of U.S. denominations, the central area may not be suitable for bills originating in other countries. For example, for bills originating from Country 1, it may be determined that segment $S_1$ (FIG. 5) provides a more preferable area to be scanned, while segment $S_2$ (FIG. 5) is more preferable for bills originating from Country 2. Alternatively, in order to sufficiently discriminate among a given set of bills, it may be necessary to scan bills which are potentially from such set along more than one segment, e.g., scanning a single bill along both $S_1$ and $S_2$.

Figure 7:
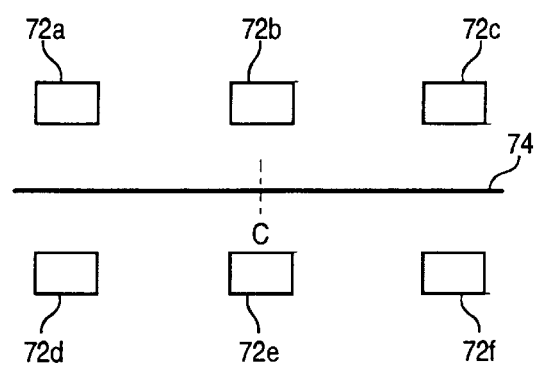
FIG. 7 is a side elevation of a multiple scanhead arrangement according to a preferred embodiment of the present invention.

To accommodate scanning in areas other than the central portion of a bill, multiple scanheads may be positioned next to each other. A preferred embodiment of such a multiple scanhead system is depicted in FIG. 7. Multiple scanheads 72a–c and 72d–f are positioned next to each other along a direction lateral to the direction of bill movement. Such a system permits a bill 74 to be scanned along different segments. Multiple scanheads 72a–f are arranged on each side of the transport path, thus permitting both sides of a bill 74 to be scanned.

Two-sided scanning may be used to permit bills to be fed into a currency discrimination system according to the present invention with either side face up. An example of a two-sided scanhead arrangement is disclosed in co-pending U.S. patent application Ser. No. 08/207,592 filed on Mar. 8, 1994 and incorporated herein by reference. Master patterns generated by scanning genuine bills may be stored for segments on one or both sides. In the case where master patterns are stored from the scanning of only one side of a genuine bill, the patterns retrieved by scanning both sides of a bill under test may be compared to a master set of single-sided master patterns. In such a case, a pattern retrieved from one side of a bill under test should match one of the stored master patterns, while a pattern retrieved from the other side of the bill under test should not match one of the master patterns. Alternatively, master patterns may be stored for both sides of genuine bills. In such a two-sided system, a pattern retrieved by scanning one side of a bill under test should match with one of the master patterns of one side (Match 1) and a pattern retrieved from scanning the opposite side of a bill under test should match the master pattern associated with the opposite side of a genuine bill identified by Match 1.

Alternatively, in situations where the face orientation of a bill (i.e., whether a bill is "face up" or "face down") may be determined prior to or during characteristic pattern scanning, the number of comparisons may be reduced by limiting comparisons to patterns corresponding to the same side of a bill. That is, for example, when it is known that a bill is "face up", scanned patterns associated with scanheads above the transport path need only be compared to master patterns generated by scanning the "face" of genuine bills. By "face" of a bill it is meant a side which is designated as the front surface of the bill. For example, the front or "face" of a U.S. bill may be designated as the "black" surface while the back of a U.S. bill may be designated as the "green" surface. The face orientation may be determinable in some situations by sensing the color of the surfaces of a bill. An alternative method of determining the face orientation of U.S. bills by detecting the borderline on each side of a bill is disclosed in co-pending U.S. patent application Ser. No. 08/207,592 filed on Mar. 8, 1994. The implementation of color sensing is discussed in more detailed below.

According to the embodiment of FIG. 7, the bill transport mechanism operates in such a fashion that the central area C of a bill 74 is transported between central scanheads 72b and 72e. Scanheads 72a and 72c and likewise scanheads 72d and 72f are displaced the same distance from central scanheads 72b and 72e, respectively. By symmetrically arranging the scanheads about the central region of a bill, a bill may be scanned in either direction, e.g., top edge first (forward direction) or bottom edge first (reverse direction). As described above with respect to FIGS. 1–3, master patterns are stored from the scanning of genuine bills in both the forward and reverse directions. While a symmetrical arrangement is preferred, it is not essential provided appropriate master patterns are stored for a non-symmetrical system.

Figure 8:
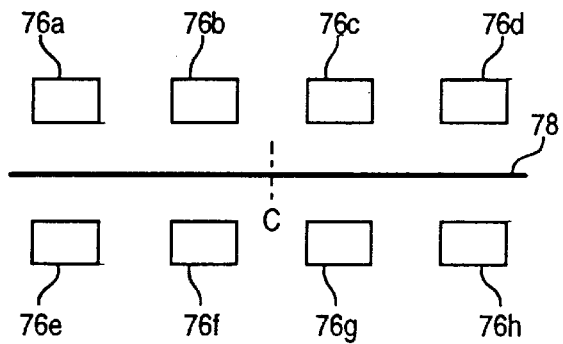
FIG. 8 is a side elevation of a multiple scanhead arrangement according to another preferred embodiment of the present invention.

While FIG. 7 illustrates a system having three scanheads per side, any number of scanheads per side may be utilized. Likewise, it is not necessary that there be a scanhead positioned over the central region of a bill. For example, FIG. 8 illustrates another preferred embodiment of the present invention capable of scanning the segments $S_1$ and $S_2$ of FIG. 5. Scanheads 76a, 76d, 76e, and 76h scan a bill 78 along segment $S_1$ while scanheads 76b, 76c, 76f, and 76g scan segment $S_2$.

Figure 9:
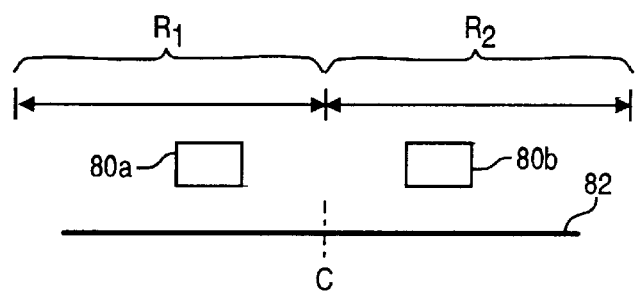
FIG. 9 is a side elevation of a multiple scanhead arrangement according to another preferred embodiment of the present invention.

FIG. 9 depicts another preferred embodiment of a scanning system according to the present invention having laterally moveable scanheads 80a–b. Similar scanheads may be positioned on the opposite side of the transport path. Moveable scanheads 80a–b may provide more flexibility that may be desirable in certain scanning situations. Upon the determination of the dimensions of a bill as described in connection with FIG. 4, a preliminary determination of the identity of a bill may be made. Based on this preliminary determination, the moveable scanheads 80a–b may be positioned over the area of the bill which is most appropriate for retrieving discrimination information. For example, if based on the size of a scanned bill, it is preliminarily determined that the bill is a Japanese 5000 Yen bill-type, and if it has been determined that a suitable characteristic pattern for a 5000 Yen bill-type is obtained by scanning a segment 2.0 cm to the left of center of the bill fed in the forward direction, scanheads 80a and 80b may be appropriately positioned for scanning such a segment, e.g., scanhead 80a positioned 2.0 cm left of center and scanhead 80b positioned 2.0 cm right of center. Such positioning permits proper discrimination regardless of the whether the scanned bill is being fed in the forward or reverse direction. Likewise scanheads on the opposite side of the transport path (not shown) could be appropriately positioned. Alternatively, a single moveable scanhead may be used on one or both sides of the transport path. In such a system, size and color information (to be described in more detail below) may be used to properly position a single laterally moveable scanhead, especially where the orientation of a bill may be determined before scanning.

FIG. 9, depicts a system in which the transport mechanism is designed to deliver a bill 82 to be scanned centered within the area in which scanheads 80a–b are located. Accordingly, scanheads 80a–b are designed to move relative to the center of the transport path with scanhead 80a being moveable within the range $R_1$ and scanhead 80b being moveable within range $R_2$.

Figure 10:
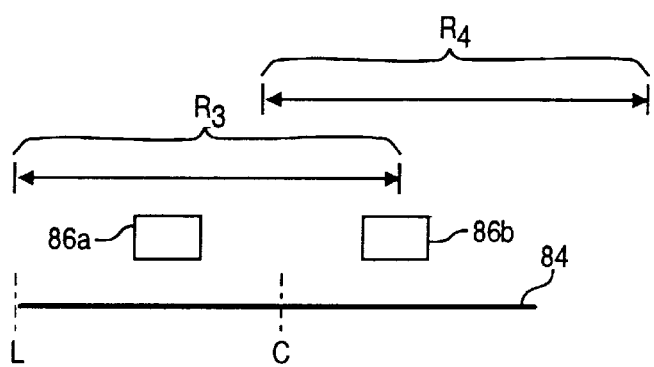
FIG. 10 is a side elevation of a multiple scanhead arrangement according to another preferred embodiment of the present invention.

FIG. 10 depicts another preferred embodiment of a scanning system according to the present invention wherein bills to be scanned are transported in a left justified manner along the transport path, that is wherein the left edge L of a bill 84 is positioned in the same lateral location relative to the transport path. Based on the dimensions of the bill, the position of the center of the bill may be determined and the scanheads 86a–b may in turn be positioned accordingly. As depicted in FIG. 10, scanhead 86a has a range of motion $R_3$ and scanhead 86b has a range of motion $R_4$. The ranges of motion of scanheads 86a–b may be influenced by the range of dimensions of bills which the discrimination system is designed to accommodate. Similar scanheads may be positioned on the opposite side of the transport path.

Alternatively, the transport mechanism may be designed such that scanned bills are not necessarily centered or justified along the lateral dimension of the transport path. Rather the design of the transport mechanism may permit the position of bills to vary left and right within the lateral dimension of the transport path. In such a case, the edge sensors 66 of FIG. 4 may be used to locate the edges and center of a bill, and thus provide positional information in a moveable scanhead system and selection criteria in a stationary scanhead system.

Figure 11:
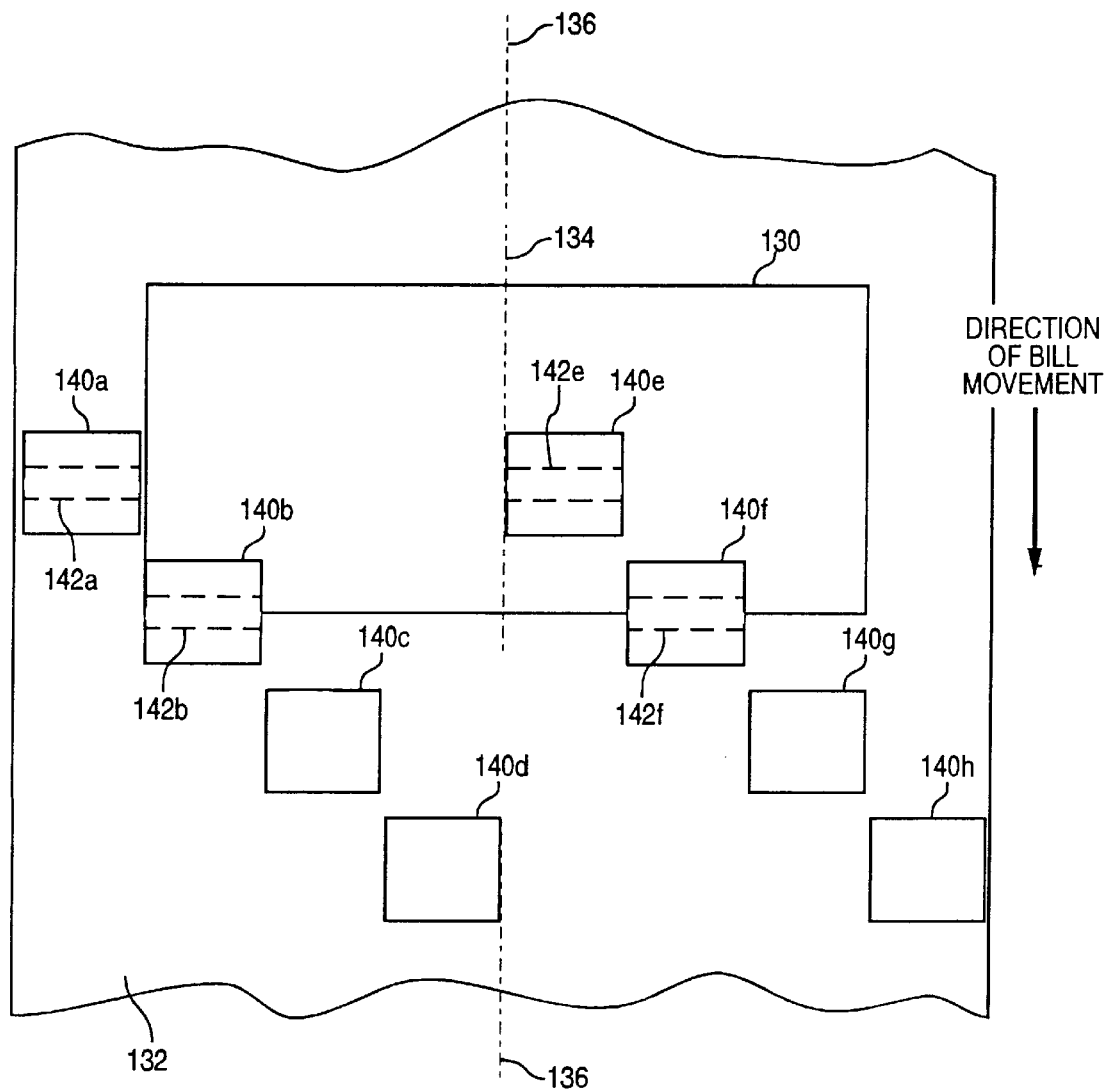
FIG. 11 is a top view of a staggered scanhead arrangement according to a preferred embodiment of the present invention.

In addition to the stationary scanhead and moveable scanhead systems described above, a hybrid system having both stationary and moveable scanheads may be used. Likewise, it should be noted that the laterally displaced scanheads described above need not lie along the same lateral axis. That is, the scanheads may be, for example, staggered upstream and downstream from each other. FIG. 11 is a top view of a staggered scanhead arrangement according to a preferred embodiment of the present invention. As illustrated in FIG. 11, a bill 130 is transported in a centered manner along the transport path 132 so that the center 134 of the bill 130 is aligned with the center 136 of the transport path 132. Scanheads 140a–h are arranged in a staggered manner so as to permit scanning of the entire width of the transport path 132. The areas illuminated by each scanhead are illustrated by strips 142a, 142b, 142e, and 142f for scanheads 140a, 140b, 140e, and 140f, respectively. Based on size determination sensors, scanheads 140a and 140h may either not be activated or their output ignored.

In general, if prior to scanning a document, preliminary information about a document can be obtained, such as its size or color, appropriately positioned stationary scanheads may be activated or laterally moveable scanheads may be appropriately positioned provided the preliminary information provides some indication as to the potential identity of the document. Alternatively, especially in systems having scanheads positioned over a significant portion of the transport path, many or all of the scanheads of a system may be activated to scan a document. Then subsequently, after some preliminary determination as to a document's identity has been made, only the output or derivations thereof of appropriately located scanheads may be used to generate scanned patterns. Derivations of output signals include, for example, data samples stored in memory generated by sampling output signals. Under such an alternative embodiment, information enabling a preliminary determination as to a document's identity may be obtained by analyzing information either from sensors separate from the scanheads or from one or more of the scanheads themselves. An advantage of such preliminary determinations is that the number of scanned patterns which have to be generated or compared to a set of master patterns is reduced. Likewise the number of master patterns to which scanned patterns must be compared may also be reduced.

While the scanheads 140a–h of FIG. 11 are arranged in a non-overlapping manner, they may alternatively be arranged in an overlapping manner. By providing additional lateral positions, an overlapping scanhead arrangement may provide greater selectivity in the segments to be scanned. This increase in scanable segments may be beneficial in compensating for currency manufacturing tolerances which result in positional variances of the printed indicia on bills relative to their edges. Additionally, in a preferred embodiment, scanheads positioned above the transport path are positioned upstream relative to their corresponding scanheads positioned below the transport path.

Figure 12A:
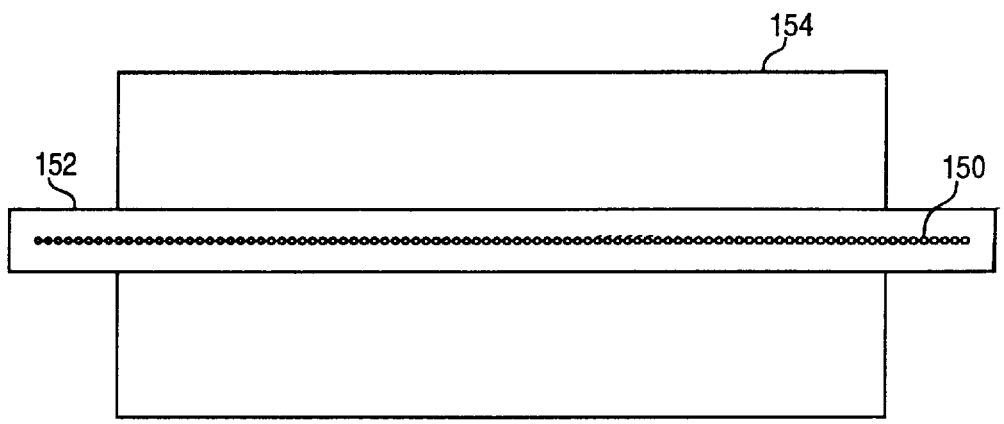
FIG. 12A is a top view of a linear array scanhead according to a preferred embodiment of the present invention illustrating a bill being fed in a centered fashion.
Figure 12B:
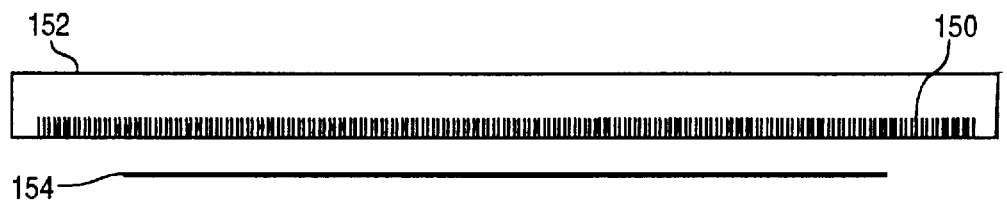
FIG. 12B is a side view of a linear array scanhead according to a preferred embodiment of the present invention illustrating a bill being fed in a centered fashion.

FIGS. 12A and 12B illustrate another preferred embodiment of the present in invention wherein a plurality of analog sensors 150 such as photodetectors are laterally displaced from each other and are arranged in a linear array within a single scanhead 152. FIG. 12A is a top view while FIG. 12B is a side elevation view of such a linear array embodiment. The output of individual sensors 150 are connected to analog-to-digital converters (not shown) through the use of graded index fibers, such as a "lens array" manufactured by MSG America, Inc., part number SLA20A1675702A3, and subsequently to a CPU (not shown) in a manner similar to that depicted in FIGS. 1 and 3A. As depicted in FIGS. 12A and 12B, a bill 154 is transported past the linear array scanhead 152 in a centered fashion. A preferred length for the linear array scanhead is about 6–7 inches (15 cm–17 cm).

In a manner similar to that described above, based on the determination of the size of a bill, appropriate sensors may be activated and their output used to generate scanned patterns. Alternatively many or all of the sensors may be activated with only the output or derivations thereof of appropriately located sensors being used to generate scanned patterns. Derivations of output signals include, for example, data samples stored in memory generated by sampling output signals. As a result, a discriminating system incorporating a linear array scanhead according to the present invention would be capable of accommodating a wide variety of bill-types. Additionally, a linear array scanhead provides a great deal of flexibility in how information may be read and processed with respect to various bills. In addition to the ability to generate scanned patterns along segments in a direction parallel to the direction of bill movement, by appropriately processing scanned samples, scanned patterns may be "generated" or approximated in a direction perpendicular to the direction of bill movement. For example, if the linear array scanhead 152 comprises one hundred and sixty (160) sensors 150 over a length of 7 inches (17.78 cm) instead of taking samples for 64 encoder pulses from say 30 sensors, samples may be taken for 5 encoder pulses from all 160 cells (or all those positioned over the bill 154). Alternatively, 160 scanned patterns (or selected ones thereof) of 5 data samples each may be used for pattern comparisons. Accordingly, it can be seen that the data acquisition time is significantly reduced from 64 encoder pulses to only 5 encoder pulses. The time saved in acquiring data can be used to permit more time to be spent processing data and/or to reduce the total scanning time per bill thus enabling increased throughput of the identification system. Additionally, the linear array scanhead permits a great deal of flexibility in tailoring the areas to be scanned. For example, it has been found that the leading edge of Canadian bills contain valuable graphic information. Accordingly, when it is determined that a test bill may be a Canadian bill (or when the identification system is set to a Canadian currency setting), the scanning area can be limited to the leading edge area of bills, for example, by activating many laterally displaced sensors for a relatively few number of encoder pulses.

Figure 13:
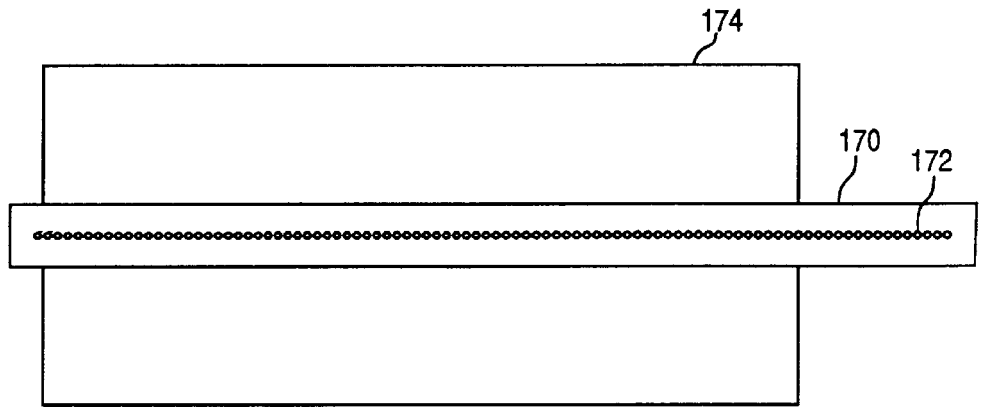
FIG. 13 is a top view of a linear array scanhead according to another preferred embodiment of the present invention illustrating a bill being fed in a non-centered fashion.

FIG. 13 is a top view of another preferred embodiment of a linear array scanhead 170 having a plurality of analog sensors 172 such as photodetectors wherein a bill 174 is transported past the scanhead 170 in a non-centered manner. As discussed above, positional information from size determining sensors may be used to select appropriate sensors. Alternatively, the linear array scanhead itself may be employed to determine the size of a bill, thus eliminating the need for separate size determining sensors. For example, all sensors may be activated, data samples derived from sensors located on the ends of the linear array scanhead may be preliminarily processed to determine the lateral position and the length of a bill. The width of a bill may be determined either by employing separate leading/trailing edge sensors or pre-processing data samples derived from initial and ending cycle encoder pulses. Once size information is obtained about a bill under test, only the data samples retrieved from appropriate areas of a bill need be further processed.

Figure 14:
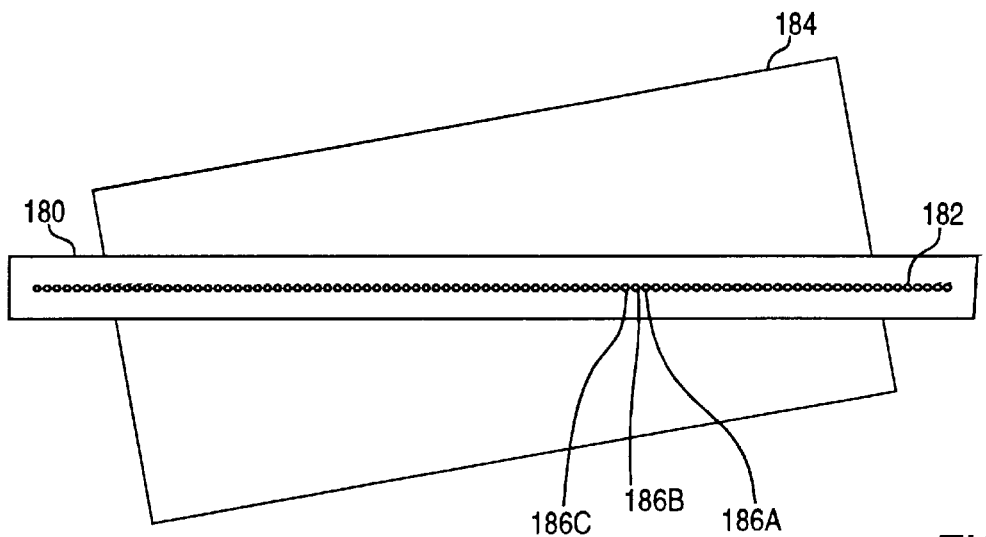
FIG. 14 is a top view of a linear array scanhead according to another preferred embodiment of the present invention illustrating a bill being fed in a skewed fashion.

FIG. 14 is a top view of another preferred embodiment of a linear scanhead 180 according to the present invention illustrating the ability to compensate for skewing of bills. Scanhead 180 has a plurality of analog sensors 182 and a bill 184 is transported past scanhead 180 in a skewed manner. Once the skew of a bill has been determined, for example through the use of leading edge sensors, readings from sensors 182 along the scanhead 180 may be appropriately delayed. For example, suppose it is determined that a bill is being fed past scanhead 180 so that the left front corner of the bill reaches the scanhead five encoder pulses before the right front corner of the bill. In such a case, sensor readings along the right edge of the bill can be delayed for 5 encoder pulses to compensate for the skew. Where scanned patterns are to be generated over only a few encoder pulses, the bill may be treated as being fed in a non-skewed manner since the amount of lateral deviation between a scan along a skewed angle and a scan along a non-skewed angle is minimal for a scan of only a few encoder pulses. However, where it is desired to obtain a scan over a large number of encoder pulses, a single scanned pattern may be generated from the outputs of more than one sensor. For example, a scanned pattern may be generated by taking data samples from sensor 186a for a given number of encoder pulses, then taking data samples from sensor 186b for a next given number of encoder pulses, and then taking data samples from sensor 186c for a next given number of encoder pulses. The number of given encoder pulses for which data samples may be taken from the same sensor is influenced by the degree of skew, the greater the degree of skew of the bill, the fewer the number of data samples which may be obtained before switching to the next sensor. Alternatively, master patterns may be generated and stored for various degrees of skew, thus permitting a single sensor to generate a scanned pattern from a bill under test.

With regards to FIGS. 12–14, while only a single linear array scanhead is shown, another linear array scanhead may be positioned on the opposite side of the transport path to permit scanning of either or both sides of a bill. Likewise, the benefits of using a linear array scanhead may also be obtainable using a multiple scanhead arrangement which is configured appropriately, for example such as depicted in FIG. 11 or a linear arrangement of multiple scanheads.

In addition to size and scanned characteristic patterns, color may also be used to discriminate bills. For example, while all U.S. bills are printed in the same colors, e.g., a green side and a black side, bills from other countries often vary in color with the denomination of the bill. For example, a German 50 deutsche mark bill-type is brown in color while a German 100 deutsche mark bill-type is blue in color. Alternatively, color detection may be used to determine the face orientation of a bill, such as where the color of each side of a bill varies. For example, color detection may be used to determine the face orientation of U.S. bills by detecting whether or not the "green" side of a U.S. bill is facing upwards. Separate color sensors may be added upstream of the scanheads described above. According to such an embodiment, color information may be used in addition to size information to preliminarily identify a bill. Likewise, color information may be used to determine the face orientation of a bill which determination may be used to select upper or lower scanheads for scanning a bill accordingly or compare scanned patterns retrieved from upper scanheads with a set of master patterns generated by scanning a corresponding face while the scanned patterns retrieved from the lower scanheads are compared with a set of master patterns generated by scanning an opposing face.

Alternatively, color sensing may be incorporated into the scanheads described above. Such color sensing may be achieved by, for example, incorporating color filters, colored light sources, and/or dichroic beamsplitters into the currency discrimination system of the present invention. Color information acquisition is described in more detail in co-pending U.S. application Ser. No. 08/219,093 filed Mar. 29, 1994, for a "Currency Discriminator and Authenticator" incorporated herein by reference. Various color information acquisition techniques are described in U.S. Pat. Nos. 4,841,358; 4,658,289; 4,716,456; 4,825,246; and 4,992,860.

Figure 15A:
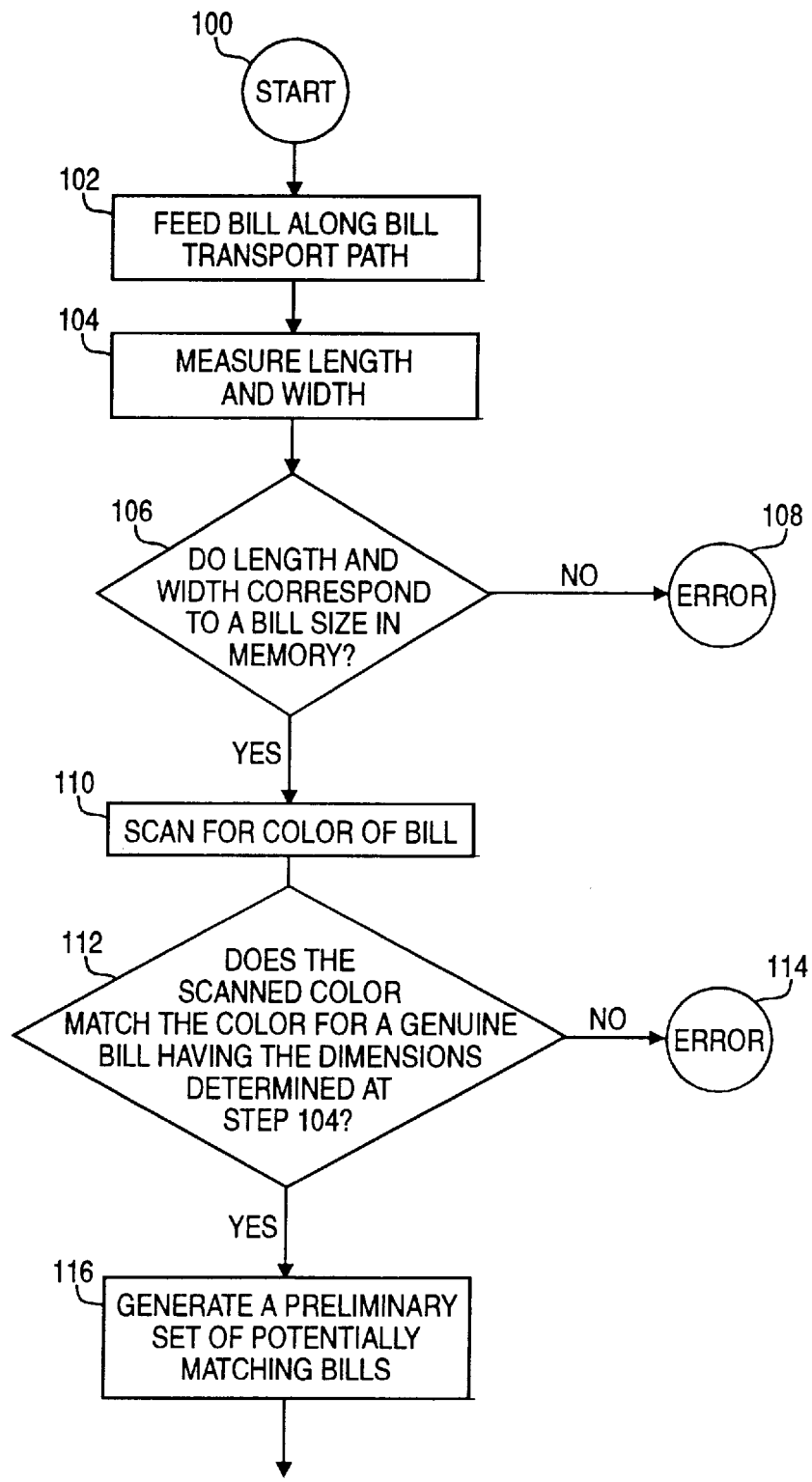
FIGS. 15A and 15B are a flowchart of the operation of a currency discrimination system according to a preferred embodiment of the present invention.
Figure 15B:
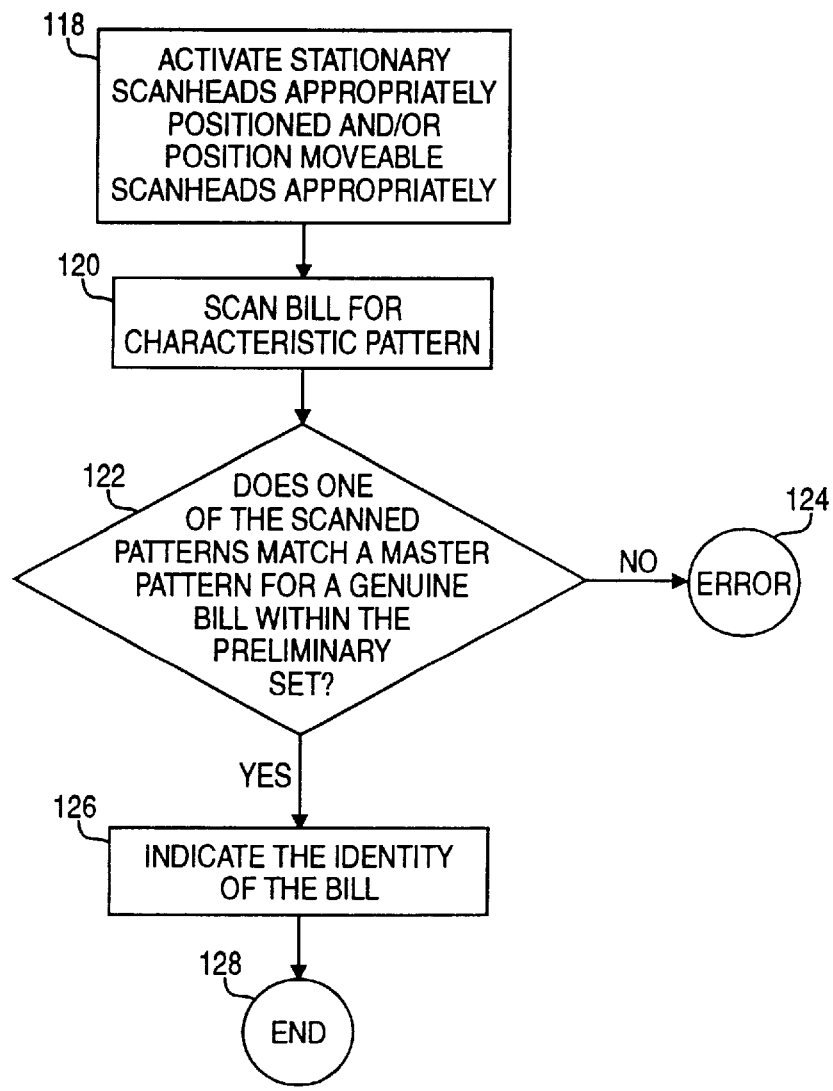

The operation of a currency discriminator according to a preferred embodiment of the present invention may be further understood by referring to the flowchart of FIGS. 15A and 15B. In the process beginning at step 100, a bill is fed along a transport path (step 102) past sensors which measure the length and width of the bill (step 104). These size determining sensors may be, for example, those illustrated in FIG. 4. Next at step 106, it is determined whether the measured dimensions of the bill match the dimensions of at least one bill stored in memory, such as EPROM 60 of FIG. 3. If no match is found, an appropriate error is generated at step 108. If a match is found, the color of the bill is scanned for at step 110. At step 112, it is determined whether the color of the bill matches a color associated with a genuine bill having the dimensions measured at step 104. An error is generated at step 114 if no such match is found. However, if a match is found, a preliminary set of potentially matching bills is generated at step 116. Often, only one possible identity will exist for a bill having a given color and dimensions. However, the preliminary set of step 116 is not limited to the identification of a single bill-type, that is, a specific denomination of a specific currency system; but rather, the preliminary set may comprise a number of potential bill-types. For example, all U.S. bills have the same size and color. Therefore, the preliminary set generated by scanning a U.S. $5 bill would include U.S. bills of all denominations.

Based on the preliminary set (step 116), selected scanheads in a stationary scanhead system may be activated (step 118). For example, if the preliminary identification indicates that a bill being scanned has the color and dimensions of a German 100 deutsche mark, the scanheads over regions associated with the scanning of an appropriate segment for a German 100 deutsche mark may be activated. Then upon detection of the leading edge of the bill by sensors 68 of FIG. 5, the appropriate segment may be scanned. Alternatively, all scanheads may be active with only the scanning information from selected scanheads being processed. Alternatively, based on the preliminary identification of a bill (step 116), moveable scanheads may be appropriately positioned (step 118).

Subsequently, the bill is scanned for a characteristic pattern (step 120). At step 122, the scanned patterns produced by the scanheads are compared with the stored master patterns associated with genuine bills as dictated by the preliminary set. By only making comparisons with master patterns of bills within the preliminary set, processing time may be reduced. Thus for example, if the preliminary set indicated that the scanned bill could only possibly be a German 100 deutsche mark, then only the master pattern or patterns associated with a German 100 deutsche mark need be compared to the scanned patterns. If no match is found, an appropriate error is generated (step 124). If a scanned pattern does match an appropriate master pattern, the identity of the bill is accordingly indicated (step 126) and the process is ended (step 128).

While some of the preferred embodiments discussed above entailed a system capable of identifying a plurality of bill-types, the system may be adapted to identify a bill under test as either belonging to a specific bill-type or not. For example, the system may be adapted to store master information associated with only a single bill-type such as a United Kingdom 5 pound bill. Such a system would identify bills under test which were United Kingdom 5 pound bills and would reject all other bill-types.

The scanheads of the present invention may be incorporated into a document identification system capable of identifying a variety of documents. For example, the system may be designed to accommodate a number of currencies from different countries. Such a system may be designed to permit operation in a number of modes. For example, the system may be designed to permit an operator to select one or more of a plurality of bill-types which the system is designed to accommodate. Such a selection may be used to limit the number of master patterns with which scanned patterns are to be compared. Likewise, the operator may be permitted to select the manner in which bills will be fed, such as all bills face up, all bills top edge first, random face orientation, and/or random top edge orientation. Additionally, the system may be designed to permit output information to be displayed in a variety of formats to a variety of peripherals, such as a monitor, LCD display, or printer. For example, the system may be designed to count the number of each specific bill-types identified and to tabulate the total amount of currency counted for each of a plurality of currency systems. For example, a stack of bills could be placed in the bill accepting station 12 of FIG. 1, and the output unit 36 of FIG. 1 may indicate that a total of 370 British pounds and 650 German marks were counted. Alternatively, the output from scanning the same batch of bills may provide more detailed information about the specific denominations counted, for example one 100 pound bill, five 50 pound bills, and one 20 pound bill and thirteen 50 deutsche mark bills.

While the invention is susceptible to various modifications and alternative forms, specific embodiments thereof have been shown by way of example in the drawings and herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

We claim:

1. A currency identification system comprising:

a bill transport mechanism for transporting a currency bill to be scanned along a transport path;

at least two scanheads positioned on a first side of said transport path so as to permit scanning of said bill along at least two segments, said scanheads being capable of detecting characteristic information from said bill along said segments and generating corresponding output signals representing variations in the detected characteristic information from which scanned patterns of characteristic information may be generated, at least two of said scanheads being laterally displaced relative to each other;

means for choosing at least one of said scanheads for scanning said bill along at least one segment based on a preliminary determination of the identity of said bill;

means for generating at least one scanned pattern from said output signals, said at least one scanned pattern representing analog variations in said characteristic information along a segment of said bill;

a memory for storing at least one master pattern associated with each genuine bill which the system is capable of identifying, said at least one master pattern representing analog variations in characteristic information along a segment of an associated genuine bill; and a signal processing means for performing a pattern comparison wherein at least one of said scanned patterns or portions thereof is compared with at least one of said master patterns or portions thereof; said signal processing means generating an indication of the identity of said bill based on said pattern comparison when said bill is one that the system is capable of identifying.

2. The currency identification system of claim 1 wherein at least two of said scanheads are stationary scanheads.

3. The currency identification system of claim 1 wherein at least two of said scanheads are laterally moveable scanheads.

4. The currency identification system of claim 3 wherein said moveable scanheads are laterally positioned based upon said preliminary determination of the identity of said bill.

5. The currency identification system of claim 1 wherein at least two of said scanheads are optical scanheads;

wherein said optical scanheads each include at least one light source for illuminating a strip of said segments of said bill, and at least one detector for receiving reflected light from a corresponding illuminated strip on said bill;

wherein said output signals represent variations in the intensity of reflected light;

wherein said means for generating at least one scanned pattern from said output signals comprises means for sampling said output signals at preselected intervals as said bill is moved past a corresponding scanhead, each of said output signal samples being proportional to the intensity of the light reflected from a different strip of a corresponding segment; and wherein said at least one master pattern is a master pattern of reflected light intensity signal samples.

6. The currency identification system of claim 1 further comprising:

at least two scanheads positioned on a second side of said transport path so as to permit scanning of said bill along at least two segments, said second-side scanheads being capable of detecting characteristic information from said bill along said segments and generating corresponding output signals representing variations in the detected characteristic information from which scanned patterns of characteristic information may be generated, at least two of said second-side scanheads being laterally displaced relative to each other.

7. The currency identification system of claim 1 further comprising:

a size detection sensor for retrieving size information from said bill;

a memory for storing master size information associated with genuine bills which the system is capable of identifying; and signal processing means for performing a size comparison wherein said size information of said bill is compared with master size information associated with at least one of the genuine bills which the system is capable of identifying and wherein said preliminary determination of the identity of said bill is based on said size comparison.

8. The currency identification system of claim 1 further comprising:
- a color detection sensor for retrieving color information from said bill;
- a memory for storing master color information associated with genuine bills which the system is capable of identifying; and
- signal processing means for performing a color comparison wherein said color information of said bill is compared with master color information associated with at least one of the genuine bills which the system is capable of identifying and wherein said preliminary determination of the identity of said bill is based on said color comparison.

9. The currency identification system of claim 1 wherein said means for choosing selects at least one of said scanheads for scanning said bill along at least one segment based on a preliminary determination of the identity of said bill.

10. The currency identification system of claim 1 wherein said means for choosing activates at least one of said scanheads for scanning said bill along at least one segment based on a preliminary determination of the identity of said bill.

11. A currency identification system comprising:
- a bill transport mechanism for transporting a currency bill to be scanned along a transport path;
- one or more laterally moveable analog scanheads positioned on a first side of said transport path so as to permit scanning of said bill along at least one segment, said scanhead being capable of detecting characteristic information from said bill along said segment and generating corresponding output signal representing variations in the detected characteristic information from which scanned patterns of characteristic information may be generated;
- means for generating at least one scanned pattern from said output signal, said at least one scanned pattern representing analog variations in said characteristic information along a segment of said bill;
- a memory for storing at least one master pattern associated with each genuine bill which the system is capable of identifying, said at least one master pattern representing analog variations in characteristic information along a segment of an associated genuine bill; and
- a signal processing means for performing a pattern comparison wherein at least one of said scanned patterns or portions thereof is compared with at least one of said master patterns or portions thereof; said signal processing means generating an indication of the identity of said bill based on said pattern comparison when said bill is one that the system is capable of identifying.

12. The currency identification system of claim 11
- wherein at least one of said scanheads is an optical scanhead;
- wherein said optical scanhead includes at least one light source for illuminating a strip of said segments of said bill, and at least one detector for receiving reflected light from a corresponding illuminated strip on said bill;
- wherein said output signals represent variations in the intensity of reflected light;
- wherein said means for generating at least one scanned pattern from said output signal comprises means for sampling said output signal at preselected intervals as said bill is moved past a corresponding scanhead, each of said output signal samples being proportional to the intensity of the light reflected from a different strip of a corresponding segment; and
- wherein said at least one master pattern is a master pattern of reflected light intensity signal samples.

13. The currency identification system of claim 11 further comprising:
- one or more laterally moveable analog scanheads positioned on a second side of said transport path so as to permit scanning of said bill along at least one segment, said second-side scanhead being capable of detecting characteristic information from said bill along said segment and generating corresponding output signal representing variations in the detected characteristic information from which scanned patterns of characteristic information may be generated.

14. The currency identification system of claim 11 further comprising:
- a size detection sensor for retrieving size information from said bill;
- a memory for storing master size information associated with said genuine bills which the system is capable of identifying; and
- signal processing means for performing a size comparison wherein said size information of said bill is compared with master size information associated with at least one of the genuine bills which the system is capable of identifying and wherein said identification indication is additionally based on said size comparison.

15. The currency identification system of claim 11 further comprising:
- a color detection sensor for retrieving color information from said bill;
- a memory for storing master color information associated with said genuine bills which the system is capable of identifying; and
- signal processing means for performing a color comparison wherein said color information of said bill is compared with master color information associated with at least one of the genuine bills which the system is capable of identifying and wherein said identification indication is additionally based on said color comparison.

16. The currency identification system of claim 11 wherein said moveable scanheads are laterally positioned based upon a preliminary determination of the identity of said bill.

17. The currency identification system of claim 11 wherein at least two of said scanheads are laterally moveable scanheads.

18. A currency identification system comprising:
- a linear array scanhead comprising at least three laterally displaced sensors positioned so as to permit scanning along at least three laterally displaced segments on a first side of a bill, said sensors being capable of detecting characteristic information from said bill along said segments and generating corresponding output signals representing variations in the detected characteristic information from which scanned patterns of characteristic information may be generated, said scanhead being able to scan at a rate in excess of about 800 bills per minute;
- means for generating at least three scanned patterns from said output signals, said at least three scanned patterns representing and approximating analog variations in said characteristic information along segments of said bill;

a memory for storing at least three master patterns associated with each genuine bill which the system is capable of identifying, said at least three master patterns representing and approximating analog variations in characteristic information along segments of an associated genuine bill; and a signal processing means for performing a pattern comparison wherein at least one of said scanned patterns or portions thereof is compared with at least one of said master patterns or portions thereof; said signal processing means determining the denomination of said bill based on said pattern comparison when said bill is one that the system is capable of identifying.

19. The currency identification system of claim 18 wherein said sensors are analog sensors.

20. The currency identification system of claim 18 wherein at least two of said linear array sensors are optical sensors;

wherein said linear array scanhead includes at least one light source for illuminating a strip of said segments of said bill, said linear array sensors receiving reflected light from said illuminated strip on said bill;

wherein said output signals represent variations in the intensity of reflected light;

wherein said means for generating at least one scanned pattern from said output signals comprises means for sampling said output signals at preselected intervals as said bill is moved past a corresponding linear array sensor, each of said output signal samples being proportional to the intensity of the light reflected from a different strip of a corresponding segment; and wherein said at least one master pattern is a master pattern of reflected light intensity signal samples.

21. The currency identification system of claim 18 further comprising:

a second linear array scanhead comprising at least two sensors positioned so as to permit scanning along at least two segments on a second side of said bill, said second-side sensors being capable of detecting characteristic information from said bill along said second-side segments and generating corresponding output signals representing variations in the detected characteristic information from which scanned patterns of characteristic information may be generated, at least two of said second-side sensors being laterally displaced relative to each other.

22. The currency identification system of claim 18 further comprising:

a size detection sensor for retrieving size information from said bill;

a memory for storing master size information associated with genuine bills which the system is capable of identifying; and signal processing means for performing a size comparison wherein said size information of said bill is compared with master size information associated with at least one of the genuine bills which the system is capable of identifying and wherein said identity indication is additionally based on said size comparison.

23. The currency identification system of claim 22 wherein said size detection sensor is positioned upstream from said scanhead; wherein said size comparison is performed before said bill is scanned by said linear array sensors; and wherein one or more of said linear array sensors are selected to scan said bill based on said size comparison.

24. The currency identification system of claim 23 wherein said signal processing means generates a preliminary set of potentially matching bills for said bill based on said size comparison and wherein said at least one of said master patterns of said pattern comparison is chosen from said preliminary set.

25. The currency identification system of claim 23 wherein said linear array sensors are optical sensors;

wherein said linear array scanhead includes at least one light source for illuminating a strip of said segments of said bill, said linear array sensors receiving reflected light from said illuminated strip on said bill;

wherein said output signals represent variations in the intensity of reflected light;

wherein said means for generating at least one scanned pattern from said output signals comprises means for sampling said output signals at preselected intervals as said bill is moved past a corresponding linear array sensor, each of said output signal samples being proportional to the intensity of the light reflected from a different strip of a corresponding segment; and wherein said at least one master pattern is a master pattern of reflected light intensity signal samples.

26. The currency identification system of claim 22 wherein said size detection sensor is positioned upstream from said scanhead; wherein said size comparison is performed before said bill is scanned by said linear array sensors; and wherein the output signals from one or more of said linear array sensors or derivations thereof are selected for the generation of scanned patterns based on said size comparison.

27. The currency identification system of claim 18 further comprising:

a color detection sensor for retrieving color information from said bill;

a memory for storing master color information associated with genuine bills which the system is capable of identifying; and signal processing means for performing a color comparison wherein said color information of said bill is compared with master color information associated with at least one of the genuine bills which the system is capable of identifying and wherein said identity indication is additionally based on said color comparison.

28. The currency identification system of claim 27 wherein said color detection sensor is positioned upstream from said scanhead; wherein said color comparison is performed before said bill is scanned by said linear array sensors; and wherein one or more of said linear array sensors are selected to scan said bill based on said color comparison.

29. The currency identification system of claim 28 wherein said signal processing means generates a preliminary set of potentially matching bills for said bill based on said color comparison and wherein said at least one of said master patterns of said pattern comparison is chosen from said preliminary set.

30. The currency identification system of claim 28 wherein said linear array sensors are optical sensors;

wherein said linear array scanhead includes at least one light source for illuminating a strip of said segments of said bill, said linear array sensors receiving reflected light from said illuminated strip on said bill;

wherein said output signals represent variations in the intensity of reflected light;

wherein said means for generating at least one scanned pattern from said output signals comprises means for sampling said output signals at preselected intervals as said bill is moved past a corresponding linear array sensor, each of said output signal samples being proportional to the intensity of the light reflected from a different strip of a corresponding segment; and wherein said at least one master pattern is a master pattern of reflected light intensity signal samples.

31. The currency identification system of claim 27 wherein said color detection sensor is positioned upstream from said scanhead; wherein said color comparison is performed before said bill is scanned by said linear array sensors; and wherein the output signals from one or more of said linear array sensors or derivations thereof are selected for the generation of scanned patterns based on said color comparison.

32. The currency identification system of claim 18 wherein the lateral positioning of said bill relative to said scanhead is determined before said bill passes said scanhead and wherein one or more of said linear array sensors are selected to scan said bill based on said lateral positioning determination.

33. The currency identification system of claim 18 wherein all of the linear array sensors of said linear array scanhead are activated; wherein the lateral positioning of said bill relative to said scanhead is determined by analyzing the output signals of the outermost linear array sensors or derivations thereof; and the output signals from one or more of said linear array sensors or derivations thereof are selected for the generation of scanned patterns based on said lateral positioning determination.

34. The currency identification system of claim 18 wherein all of the linear array sensors of said linear array scanhead are activated; wherein the lateral dimension of said bill is determined by analyzing the output signals of the outermost linear array sensors or derivations thereof; and the output signals from one or more of said linear array sensors or derivations thereof are selected for the generation of scanned patterns based on said lateral dimension determination.

35. The currency identification system of claim 18 wherein the dimension of said bill parallel to the direction of bill movement is determined by analyzing the output signals of one or more of said linear array sensors or derivations thereof.

36. The currency identification system of claim 18 wherein the skew of said bill is determined by analyzing the output signals of one or more of said linear array sensors or derivations thereof.

37. The currency identification system of claim 18 wherein the output signals from one or more of said linear array sensors or derivations thereof are selected for the generation of scanned patterns based on a determination of the skew of said bill.

38. The currency identification system of claim 37 wherein a scanned pattern is generated from the output signal of two or more of said linear array sensors or derivations thereof.

39. The currency identification system of claim 18 wherein said bill is transported along a transport path in a skewed manner and wherein the generation of a scanned pattern from a given sensor is delayed by an amount related to the angle of skewing of said bill and the lateral position of said given sensor.

40. The currency identification system of claim 18 wherein the lateral positioning of said bill relative to said scanhead is determined before said bill passes said scanhead and wherein one or more of said linear array sensors are selected to scan said bill based on said lateral positioning determination or the output signals from one or more of said linear array sensors or derivations thereof are selected for the generation of scanned patterns based on said lateral positioning determination.

41. A currency identification system comprising:

a bill transport mechanism for transporting a currency bill to be scanned along a transport path at a rate in excess of about 800 bills per minute;

a linear array scanhead comprising at least two sensors positioned on a first side of said transport path so as to permit scanning of said bill along at least two segments, said scanheads being capable of detecting characteristic information from said bill along said segments and generating corresponding output signals representing variations in the detected characteristic information from which scanned patterns of characteristic information may be generated, at least two of said sensors being laterally displaced relative to each other;

means for choosing at least one of said scanheads for scanning said bill along at least one segment based on a preliminary determination of the identity of said bill;

means for generating at least one scanned pattern from said output signals, said at least one scanned pattern representing analog variations in said characteristic information along a segment of said bill;

a memory for storing at least one master pattern associated with each genuine bill which the system is capable of identifying, said at least one master pattern representing analog variations in characteristic information along a segment of an associated genuine bill; and a signal processing means for performing a pattern comparison wherein at least one of said scanned patterns or portions thereof is compared with at least one of said master patterns or portions thereof; said signal processing means generating an indication of the identity of said bill based on said pattern comparison when said bill is one that the system is capable of identifying.

42. The currency identification system of claim 41 wherein said means for choosing selects at least one of said scanheads for scanning said bill along at least one segment based on a preliminary determination of the identity of said bill.

43. The currency identification system of claim 41 wherein said means for choosing activates at least one of said scanheads for scanning said bill along at least one segment based on a preliminary determination of the identity of said bill.

44. A document identification system comprising:

a linear array scanhead comprising at least three laterally displaced sensors positioned so as to permit scanning along at least three laterally displaced segments on a first side of a document, said sensors being capable of detecting characteristic information from said document along said segments and generating corresponding output signals representing variations in the detected characteristic information from which scanned patterns of characteristic information may be generated, said scanhead being able to scan at a rate in excess of about 800 documents per minute;

means for generating at least three scanned patterns from said output signals, said at least three scanned patterns representing and approximating analog variations in said characteristic information along segments of said document;

a memory for storing at least three master patterns associated with each genuine document which the system is capable of identifying, said at least three master patterns representing and approximating analog variations in characteristic information along segments of an associated genuine document; and a signal processing means for performing a pattern comparison wherein at least one of said scanned patterns or portions thereof is compared with at least one of said master patterns or portions thereof; said signal processing means determining the denomination of said document based on said pattern comparison when said document is one that the system is capable of identifying.

45. An improved method for identifying currency bills in a currency identification system, the system being capable of identifying bills that are of one or more bill-types, comprising the steps of:

scanning a test bill along at least three laterally displaced segments located on a first side of said test bill for variations in characteristic information along said segments, said scanning being performed by at least three laterally displaced analog first-side sensors at a rate in excess of about 800 bills per minute;

generating an output signal from at least three of said sensors;

generating at least three scanned patterns from said output signals, said at least three scanned patterns representing and approximating analog variations in said characteristic information along segments of said bill;

performing a pattern comparison wherein at least one of said scanned patterns or portions thereof is compared with one or more master patterns or portions thereof from a set of master patterns, said master patterns being associated with genuine bills of the bill-types that the system is capable of identifying, said master patterns representing and approximating analog variations in characteristic information along segments of an associated genuine bill; and determining the denomination of said test bill based on said pattern comparison when said test bill is one that the system is capable of identifying.

46. An improved method for identifying documents in a document identification system, the system being capable of identifying documents that are of one or more document-types, comprising the steps of:

scanning a test document along at least three laterally displaced segments located on a first side of said test document for variations in characteristic information along said segments, said scanning being performed by at least three laterally displaced analog first-side sensors at a rate in excess of about 800 documents per minute;

generating an output signal from at least three of said sensors;

generating at least three scanned patterns from said output signals, said at least three scanned patterns representing and approximating analog variations in said characteristic information along segments of said document;

performing a pattern comparison wherein at least one of said scanned patterns or portions thereof is compared with one or more master patterns or portions thereof from a set of master patterns, said master patterns being associated with genuine documents of the document-types that the system is capable of identifying, said master patterns representing and approximating analog variations in characteristic information along segments of an associated genuine document; and determining the denomination of said test document based on said pattern comparison when said test document is of a document-type that the system is capable of identifying.

47. A currency identification system comprising:

a bill transport mechanism for transporting a currency bill to be scanned along a transport path;

at least two scanheads positioned on a first side of said transport path so as to permit scanning of said bill along at least two segments, said scanheads being capable of detecting characteristic information from said bill along said segments and generating corresponding output signals representing variations in the detected characteristic information from which scanned patterns of characteristic information may be generated, at least two of said scanheads being laterally displaced relative to each other;

means for selecting at least one of said output signals for the generation of scanned patterns based on a preliminary determination of the identity of said bill;

means for generating at least one scanned pattern from said output signals, said at least one scanned pattern representing analog variations in said characteristic information along a segment of said bill;

a memory for storing at least one master pattern associated with each genuine bill which the system is capable of identifying, said at least one master pattern representing analog variations in characteristic information along a segment of an associated genuine bill; and a signal processing means for performing a pattern comparison wherein at least one of said scanned patterns or portions thereof is compared with at least one of said master patterns or portions thereof; said signal processing means generating an indication of the identity of said bill based on said pattern comparison when said bill is one that the system is capable of identifying.

48. The currency identification system of claim 47 wherein at least two of said scanheads are stationary scanheads.

49. The currency identification system of claim 47 wherein at least two of said scanheads are laterally moveable scanheads.

50. The currency identification system of claim 49 wherein said moveable scanheads are laterally positioned based upon said preliminary determination of the identity of said bill.

51. The currency identification system of claim 47 wherein at least two of said scanheads are optical scanheads;

wherein said optical scanheads each include at least one light source for illuminating a strip of said segments of said bill, and at least one detector for receiving reflected light from a corresponding illuminated strip on said bill;

wherein said output signals represent variations in the intensity of reflected light;

wherein said means for generating at least one scanned pattern from said output signals comprises means for sampling said output signals at preselected intervals as said bill is moved past a corresponding scanhead, each of said output signal samples being proportional to the intensity of the light reflected from a different strip of a corresponding segment; and wherein said at least one master pattern is a master pattern of reflected light intensity signal samples.

52. The currency identification system of claim 47 further comprising:

at least two scanheads positioned on a second side of said transport path so as to permit scanning of said bill along at least two segments, said second-side scanheads being capable of detecting characteristic information from said bill along said segments and generating corresponding output signals representing variations in the detected characteristic information from which scanned patterns of characteristic information may be generated, at least two of said second-side scanheads being laterally displaced relative to each other.

53. The currency identification system of claim 47 further comprising:

a size detection sensor for retrieving size information from said bill;

a memory for storing master size information associated with genuine bills which the system is capable of identifying; and signal processing means for performing a size comparison wherein said size information of said bill is compared with master size information associated with at least one of the genuine bills which the system is capable of identifying and wherein said preliminary determination of the identity of said bill is based on said size comparison.

54. The currency identification system of claim 47 further comprising:

a color detection sensor for retrieving color information from said bill;

a memory for storing master color information associated with genuine bills which the system is capable of identifying; and signal processing means for performing a color comparison wherein said color information of said bill is compared with master color information associated with at least one of the genuine bills which the system is capable of identifying and wherein said preliminary determination of the identity of said bill is based on said color comparison.

55. A currency identification system comprising:

a bill transport mechanism for transporting a currency bill to be scanned along a transport path at a rate in excess of about 800 bills per minute;

a linear array scanhead comprising at least two sensors positioned on a first side of said transport path so as to permit scanning of said bill along at least two segments, said scanheads being capable of detecting characteristic information from said bill along said segments and generating corresponding output signals representing variations in the detected characteristic information from which scanned patterns of characteristic information may be generated, at least two of said sensors being laterally displaced relative to each other;

means for selecting at least one of said output signals for the generation of scanned patterns based on a preliminary determination of the identity of said bill;

means for generating at least one scanned pattern from said output signals, said at least one scanned pattern representing analog variations in said characteristic information along a segment of said bill;

a memory for storing at least one master pattern associated with each genuine bill which the system is capable of identifying, said at least one master pattern representing analog variations in characteristic information along a segment of an associated genuine bill; and a signal processing means for performing a pattern comparison wherein at least one of said scanned patterns or portions thereof is compared with at least one of said master patterns or portions thereof; said signal processing means generating an indication of the identity of said bill based on said pattern comparison when said bill is one that the system is capable of identifying.

\* \* \* \* \*